INVENTORS
ALBERT A. MAGDALL
FRANCIS R. RAUSCH
ELLIOTT R. MARSH
BY William J. Barrett
ATTORNEY

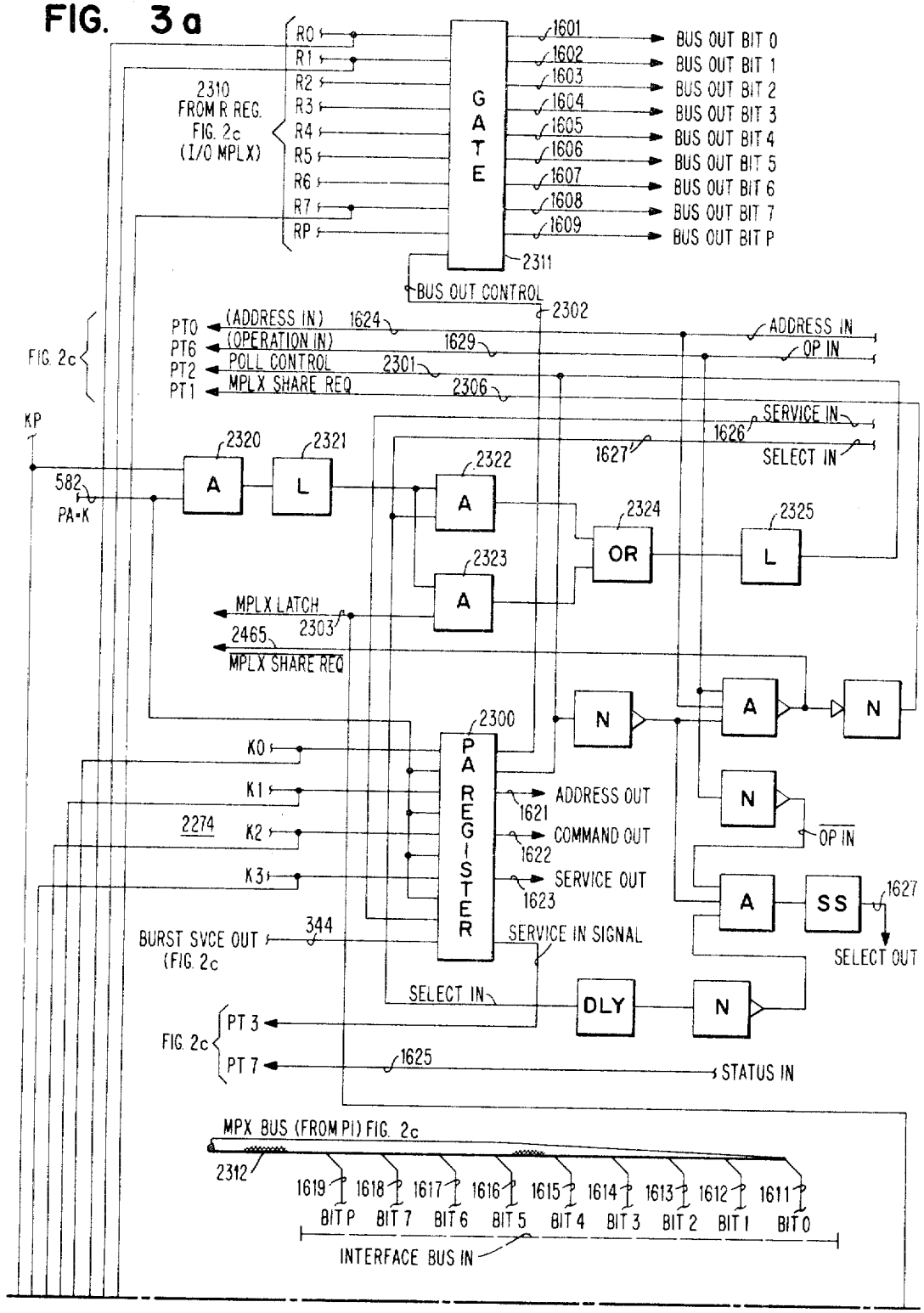

I/O CONTROL WORDS

3,377,619
DATA MULTIPLEXING SYSTEM
Elliott R. Marsh, Endicott, and Albert A. Magdall and Francis R. Rausch, Vestal, N.Y., assignors to International Business Machines Corporation, New York, N.Y., a corporation of New York
Filed Apr. 6, 1964, Ser. No. 357,361
7 Claims. (Cl. 340—172.5)

The present invention is directed to a data multiplexing system comprising a plurality of input-output units and a central processing unit. In particular, the present invention is directed to a data multiplexing system comprising a plurality of serially connected input-output units, and a central processing unit. It is to be understood that throughout the specification, claims and drawings the following terms are synonymous: Input-output units, input-output devices, I/O units, I/O devices, peripheral units and peripheral devices.

The central processing unit (CPU) which forms a portion of the present invention contains a main storage device to which data from said I/O device is transferred and from which data is transferred to a given I/O device. In this main storage device are contained a plurality of addressable data locations for the data being handled. A plurality of registers settable to indicate a byte (8 bits) of data are contained in the CPU to provide address selection of indicated byte locations in said storage device; temporary single byte status devices to indicate conditions within the machine and control subsequent operations; and temporary storage buffers to register data bytes prior to, or during, or after a manipulation of this data within some arithmetical, logical or input-output operation. In addition to these features, the central processing unit of the present invention includes a "read-only" storage. This storage, hereinafter referred to as ROS, contains a very large number of 60 bit micro-instruction words permanently contained therein which may be repeatedly read out and used to control the CPU.

Instructions and data are contained in said main storage area and from these instructions, the CPU is controlled to manipulate data to accomplish all those functions for which the data processing machine is designed. Further included in this main storage device are two auxiliary storage areas designated CPU Bump memory and UCW Bump memory.

In operaton, instructions are read out from said main storage device in a series of instruction cycles and the data in the instruction word stored in the various registers contained in the machine as indicated by the operation to be performed.

The "read-only" storage ROS and particularly the micro instruction words contained therein control the flow of data within the system and control also the functions which will be performed by the units within the system. The first "read-only" micro instruction word for every operation is the same and is used to control the CPU to read from the main memory the first byte of the instruction word for that operation.

Based on the operation to be performed by the machine, a sequence of micro-control instruction words will be read from the "read-out" storage ROS.

The first 8-bit byte of each instruction word is the Operation Code. This Operation Code is stored in a register which subsequently controls the selection of the next micro instruction words to distribute data and to perform the calculations, establish conditions, and control logical operations required when the instruction word is fully loaded. In the last few instruction cycles in the read-out of the instruction word from the main memory, the bits contained in the Operation Code select a particular portion of the Read-Only storage which will control the machine for the manipulation of data as directed by the instruction word just loaded into the hardware registers of the machine.

In essence, therefore, the central processing unit of the present invention contains the apparatus as specified above controlled by a series of micro-instruction words which dictate the structural configuration of the machine in every cycle of its operation. The macro or main instruction stream dictates the operational functions to be performed by the machine.

The multiplexing apparatus utilizes a sequence of micro instructions to effectively transform the CPU into an interface for the transmission and reception of data.

Through the use of the micro-instruction words the CPU may be rapidly transformed from a data processor to an input-output interface with a degree of flexibility and rapidity so as to accommodate a very large number of input-output devices on an individual "need" basis.

It is therefore an object of this invention to provide a system for multiplexing data from a plurality of input-output units to a data processing machine wherein the data processor is controlled to deflect the state of each individual I/O device for each data transmission.

It is another object of this present invention to provide a data processing system having a plurality of serially connected input-output devices wherein the transfer of data to or from said input-output device may be accomplished on a random time base determined by the requirement of the I/O device. The input-output devices which are connected serially to the output of the central processing unit utilize a polling arrangement wherein a serially generated pulse is propagated through each I/O device successively. When an input-output device desires service, the circuit into which the polling pulse is connected disconnects the polling pulse from the remaining serially connected I/O devices and transmits an address on a data bus to the central processing unit to indicate the service required and the identity of the unit which requires this service. In response to the identification of the unit the central processing unit brings out the data associated with that individual I/O device and prepares to continue with the operation just initiated. By this serially connected arrangement of input-output devices and the use of a polling pulse, the maximum use is made of the relatively high speed of the central processing unit and the low speed of the input-output units individually to accommodate a maximum number of I/O devices. It is therefore a further object of the present invention to provide an arrangement of I/O devices and central processing unit serially connected and individually sampled by means of a polling pulse propagated successively through each individual I/O device.

One of the features utilized in this invention is the so-called Unit Control Word (UCW) which is separately identified with a particular I/O device for a series of operations determined at the time that the input-output device is selected by the central processing unit. These Unit Control Words are stored at addressable locations in main storage and are read out and stored in the individual hardware registers of the Central Processing Unit upon a request for service by its associated input-output unit. When an operation is complete, the Unit Control Word is restored in memory with up-dated data as to conditions at the I/O device, the bytes of data which have been read and the address to which the data from the I/O device is read or written. So long as the operation being performed by the I/O device has not been completed, this Unit Control Word will control the processor when service is requested from its associated unit. It is therefore another further object of the present invention to provide a multiplex operation utilizing a data processing machine wherein Unit Control Words identifiable with a particular I/O device are extracted when service is requested from the I/O device to control the flow of information to and from this device at this time.

Associated with the Unit Control Word is a further instruction designated the Command Control Word (CCW) which contains data designating a particular I/O operation. This CCW contains information which will be utilized in the UCW when a particular I/O device associated with the UCW is selected for operation by the Central Processing Unit. The UCW when loaded with information provides an on-line control for the particular I/O device with which it is always associated while the CCW may be thought of as a static instruction which is merged with the unit control word upon the actual selection of an I/O device. This allows great flexibility since it is not necessary that the CCW's be generated at the same time that the I/O devices are selected. Instead the CCW's can be loaded during the progress of a problem program for use at some future time by an input-output instruction contained in the instruction stream of this program. This feature of having a CCW as an auxiliary instruction word provides maximum flexibiilty to the multiplexing apparatus. It is therefore another and further object of the present invention to provide a command control word as an instruction for use in cooperation wtih the unit control word to furnish data and commands for a particular I/O device upon the selection of the I/O device.

Another feature of the present invention particularly associated with the CCW is the utilization of the unit control word with the CCW so that upon conclusion of an operation specified by the unit control word, a new command control word can be selected and the operation being performed with the I/O device may be extended so that data may be transferred in different quantities or to or from separate fields in storage. Further than this, the subsequent CCW may be utilized to change the operation of the associated I/O device so that instead of reading data from the I/O device to the CPU, the CPU transfers data to the I/O device. Thus a separate I/O program can be established utilizing sequential CCW's for controlling the associated I/O device without the necessity for re-entry into the main program and the time loss involved in selecting and transferring data from the main instruction routine to the individual registers to initiate a separate operation.

It is therefore still another object of the present invention to provide for the chaining of data and/or commands with respect to an individual I/O device.

A further object of the present invention is to provide channel status word for flexibility and control of data in said multiplexing apparatus.

The foregoing and other objects, features and advantages of the invention will be apparent from the following more particular description of a preferred embodiment of the invention, as illustrated in the accompanying drawings.

In the drawings:

FIG. 1 is a diagrammatic illustration of the connections between a multiplexing device including a central processing unit and a plurality of input-output devices.

FIGS. 2a, 2b, and 2c taken together form the data flow circuit of a central processing unit used in the present invention.

FIGS. 3a and 3b are a detailed circuit for the multiplex interface contained in the central processing unit.

The present invention includes as a part thereof a data processing system forming the subject matter of a patent application, Ser. No. 357,372, filed Apr. 6, 1964, in the name of Amdahl et al., filed contemporaneously herewith. In this patent application is contained a very complete description of all the circuits of the central processing unit used in the present invention. Further, this application contains an appendix of all micro instruction words and flow charts of all operations including the present multiplex operation. For details of circuitry, micro instruction word details and flow diagrams, applicants rely on the above application to supply the same.

Figure 2A:
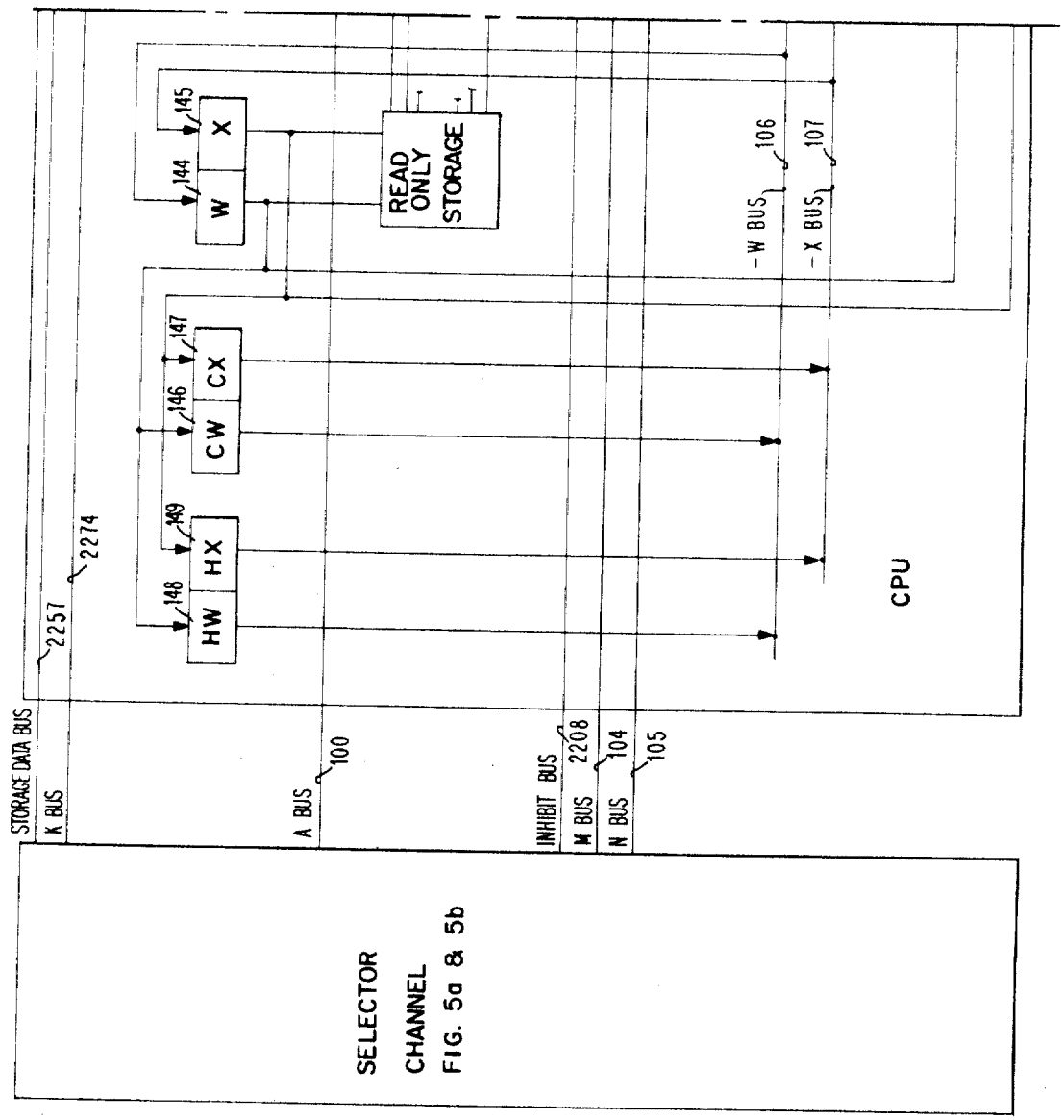
Figure 2B:
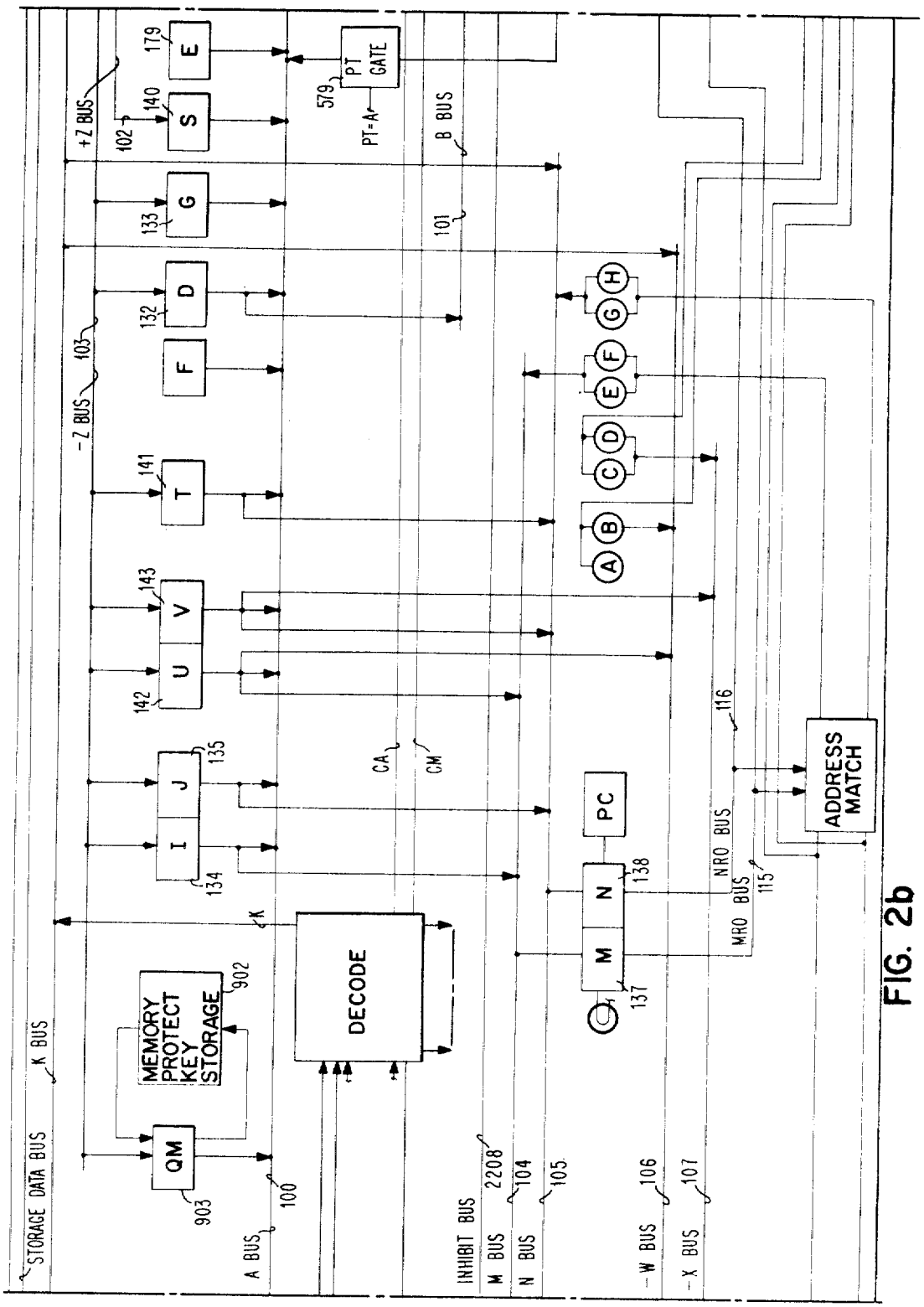
Figure 2C:
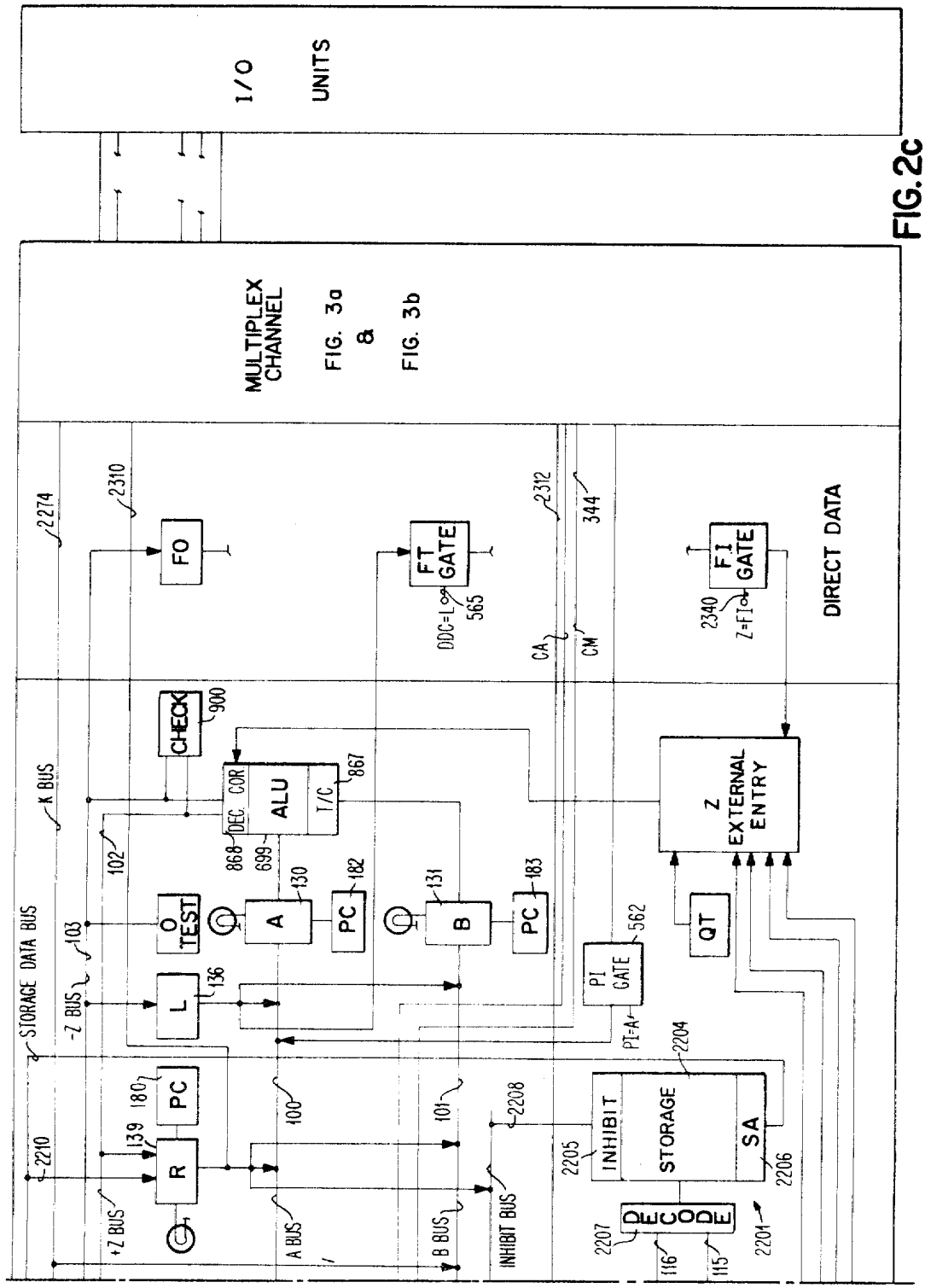

The data processing machine used in the present invention is shown in FIGS. 2a, 2b and 2c. Storage device 2204 is utilized for the retention of data transferred to or from I/O devices, for general usage, for instructions, etc. Besides the storage device, per se, containing settable square hysteresis loop cores, sense amplifiers 2206 are provided for information read from said cores while inhibit drivers are provided for setting the cores to reflect data on bus 2208.

A decode 2207 selects the 8-bit byte within storage 2204 to be read out on data bus 2257.

An M register 137 and an N register 138 are the storage address registers which are utilized to select a byte location in storage from which information will be read or written. Each register 137 and 138 contains one byte or 8 bits. By setting a number into the MN register a particular location in core storage will be read therefrom.

An I register 134 and a J register 135, FIG. 2b, normally operate as the instruction counter for the data processing machine. This combination of registers where the I register is the high order and the J register is the low order normally contain the address of the next instruction word byte which is to be read from the storage 2204. However, depending on the function which is to be performed by the CPU, the contents of the IJ register may be stored within the data storage device 2204 in a location designated as CPU bump and the IJ register used for the location of an operand address.

A U register 142 and a V register 143 each have a capacity of one byte. The U register contains the high order byte while the V register contains the low order byte. The UV register normally contains the address of the operand which is to be utilized in the data processing apparatus. A T register 141 is also an address register and is normally used for selecting particular areas in storage designated general purpose registers.

The T register which contains only one byte addresses the low orders in storage. The general purpose register is indicated by the high order bits in the T register while the bytes within a general purpose register are designated by the lowest two bits so that a general purpose register which has a total of four bytes or 32 bits may have each byte individually selected.

The IJ, UV, and T registers are connected to the MN bus 104, 105. In the ordinary sequence of operations the address contained in these registers is moved during one micro instruction word from a particular address register to the MN register and in the subsequent micro control instruction a location within storage is read out.

A D register 132, FIG. 2b, is a general purpose register and is generally in various operations for holding a byte of data while the central processing unit manipulates other data in combination therewith to generate from logical conclusion from the resulting combination.

A G register 133 is the location where the operation code byte is stored. The S register 140 contains 8 latches labelled S0 through S7. These latches are used for indicating a particular condition or control function within the machine and generate signals, influence machine operations through selection of micro instructions.

In general each latch in the S register 140 serves a specific function as follows:

S0—True/Complement Latch.
S1—Execute Code and Data Channel Request Latch.
S2—Answer Not Zero Latch.
S3—Carry Latch.

S4—Z High=Zero.
S5—Z low=Zero.
S6 & S7—General Purpose Switches.
S8—Decode Latch.

The L register 136 is generally used to store the length of the field to be read from storage; that is to say, the number of bytes. However, the L register also is used as a general purpose register and data may be stored therein for use in some logical or arithmetic operation.

An arithmetic and logical unit ALU699, FIG. 2c, is connected between an A register 130 and a B register 131 to receive data from said A and B register and perform some arithmetic or logical operation. The ALU contains circuitry disclosed in the aforementioned application for doing a true complement operation on a byte of data presented by the B register 131. It also has a facility to process either the high or the low portion of the byte contained in the B register. The output of the A register is presented to the ALU and on this side, provision is made for using the high or low portion of the byte within the A register. Further, this portion of the ALU contains circuitry for accepting the character STRAIGHT; that is to say, with the high order bits at the high order positions and the low order bits at the low order positions, or crossing the bits so that high four bits appear at the low four bits positions and vice versa.

Carry controls are provided at the output of the ALU and operate to set the status latches in the S register 140 to affect the sequence of subsequent micro instruction words. Noting the chart above it can be seen that the S2 latch indicates that the data presented to the ALU is $\overline{0}$. In the event of a carry in the ALU a status latch S3 is set. The status latches S4 and S5 indicate respectively when set that the output of the high four bits is equal to 0 and the output of the low bits is equal to 0. Status latch S0 is a True-Complement latch and can be set as a result of an operation in the ALU.

The R register 139, FIG. 2c, acts primarily as the buffer for the storage device 2204. Information is read out from the sense amplifiers 2206 and is transferred to the R register 139. From the R register, data is transferred through the A bus 100, the ALU and to any particularly designated registers previously mentioned. Data may also be transferred from the R register onto the B bus 101 and into the B register 131.

In any event, the first register to which data is transferred in the central processing unit is the R register 139. From the output of the R register information is transferred back into storage 2204 on the inhibit bus 2208.

In a typical operation of the CPU at the beginning of any new instruction read out, the address in the IJ register 134, 135 is moved into the MN address register 137, 138 and on a subsequent cycle the address in storage 2204 is selected and the data read into R register 139. From the R register 139, data is read through A bus 100, the ALU 699, onto the Z bus 103 and into the G register 133. During this time the address in the IJ register would have been incremented and another address selected in the storage and the byte of data transferred to the R register, and subsequently, perhaps, to the L register to indicate one of a number of conditions.

On succeeding IJ cycles, data will be transferred to the T register to indicate a general purpose register in storage which is to be selected and with which the contents of UV register 142, 143 will be added to indicate a particular address in storage.

On each instruction cycle the output of the ALU is sensed by means of the status register latches which in turn operate to help control the next address location in read-only storage from which the next successive micro instruction word will be selected. As discussed previously the G register 133 which contains a number of bit latches is also used to control the selection of the addresses of micro instruction words in the "read-only" storage. This decoding is specifically described and shown in the above-mentioned Amdahl et al. application.

The WX register 144, 145, shown in FIG. 2a, selects the address in the "read-only" storage which will be read out to control the machine. Register HW and HX, 148, 149, CW and CX, 146, 147, are used in conjunction with the "read-only" storage and are described particularly in the above-mentioned case. The selector channel 5a and 5b shown in FIG. 2a is an output from the central processing unit and will be described in more detail hereinafter. As it will be noticed there is an output 2257 from the storage 2204, a K bus 2274, and A bus 100, and the inhibit bus 2208, connected to the selector channel.

The multiplex operation to which the present invention particularly directed is connected to the CPU by the data bus 2310. The input from the multiplex channel is shown as a bus 2312 connected to the A bus 100. Information flow from storage would be to the R register and thence to the bus out line 2310. Information would be on line 2312, A register 130, the ALU, the R register and the Inhibit bus 2208. The control circuitry data is transferred on the K bus 2274 and the control lines designated PI and PT. The information from the multiplex channel is transferred to an I/O unit not forming part of the CPU. The I/O is shown in the above mentioned application and are further shown in a patent application filed contemporaneously herewith in the name of Moyer et al., Ser. No. 357,383 filed Apr. 6, 1964.

Figure 1:
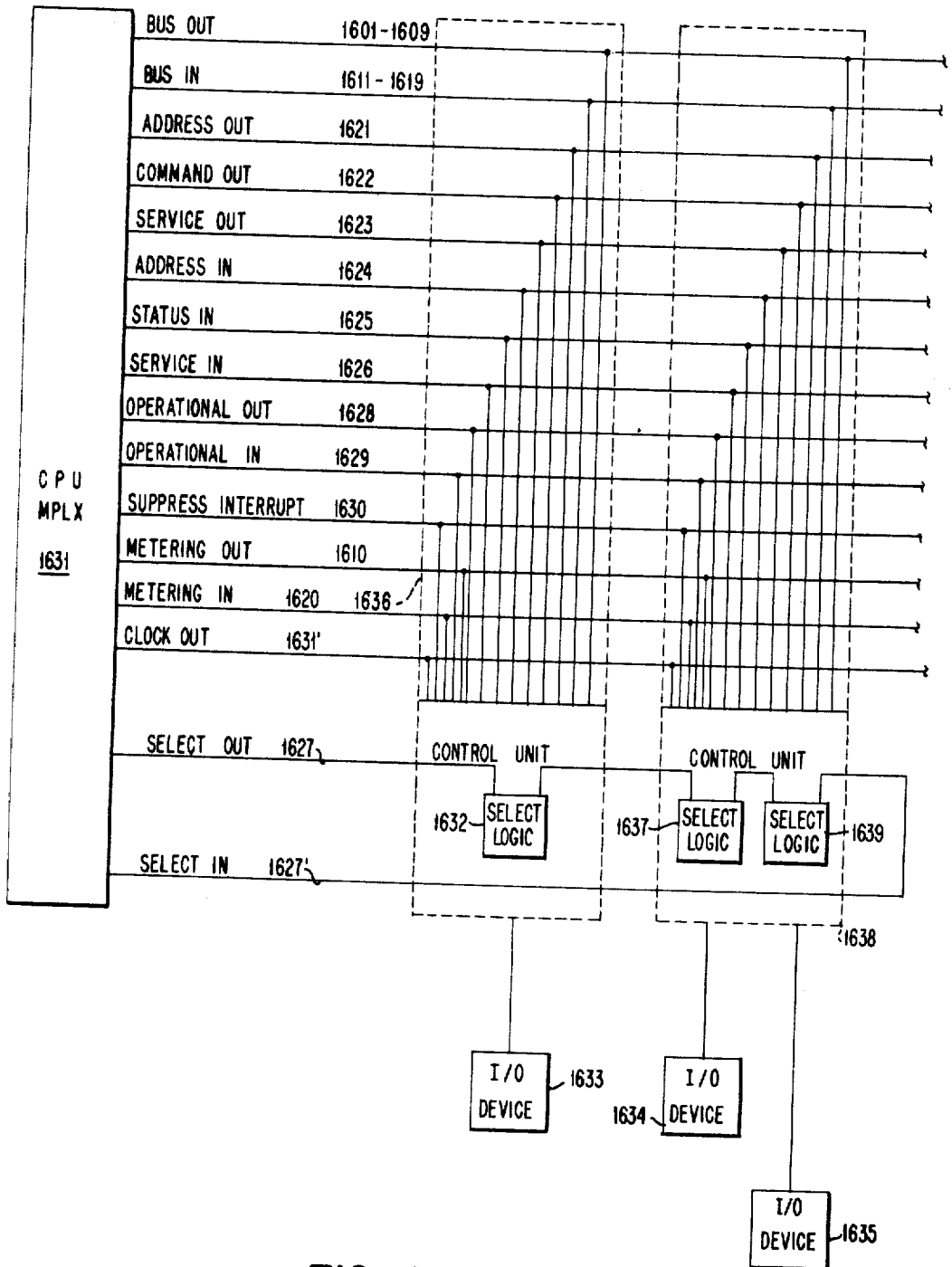

Referring to FIGURE 1 the reference numeral 1631 designates generally the central processing unit (CPU) of a computer including a multiplex channel (see FIGS. 3a and 3b) which may be connected by means of an interface comprising BUS OUT lines 1601–1609, BUS IN lines 1611–1619, ADDRESS OUT, COMMAND OUT and SERVICE OUT Tag lines 1621–1623, ADDRESS IN, STATUS IN and SERVICE IN Tag lines 1624–1626, SELECT OUT and SELECT IN lines 1627 and 1627', as well as INTERLOCK and SPECIAL CONTROL lines, OPERATIONAL OUT, OPERATIONAL IN and SUPPRESS INTERRUPT 1628–1630 to a plurality of I/O devices 1633, 1634 and 1635 through a single I/O control unit 1636 and a multiple I/O control unit 1638, respectively. The BUS OUT and BUS IN lines are used to transfer data between the CPU and the I/O units. The Tag lines transmit control signals. METERING OUT and METERING IN lines 1610 and 1620 connect the CPU and control units for time metering purposes. A CLOCK OUT line 1631' is provided for controlling the control unit meter when the CPU is waiting or halted. The central processing unit 1631 is connected to the control units 1636 and 1638 by the SELECT OUT and SELECT IN lines 1627 and 1627' in a serial fashion, SELECT OUT 1627 being connected through logic circuitry of each of the control units in a series relation. The SELECT OUT line is pulsed periodically by the CPU for serially polling the I/O control units to select a specific one or permit one of the several I/O units to seize the channel in order of priority as determined by their proximity to the CPU.

*Multiplex channel circuit*

The multiplex channel circuitry is shown schematically in FIG. 1. Details of the apparatus in the CPU connecting this apparatus are shown particularly in FIGS. 3a and 3b and generally in FIGS. 2a, 2b and 2c.

The output from the R register 139 on FIG. 2c is gated to the BUS OUT lines (to the I/O device) 1601 through 1609. BUS OUT Control 2302 effects the switching to allow the output of the R register R0 through R7 and RP to be gated to the BUS OUT lines Bit 0 through Bit 7 and Bit P. The BUS IN lines (from the I/O device) 1611 through 1619 on FIG. 3a run directly to FIG. 2c block 562 entitled "Gate PI to A." A signal on line 562 "$A = PI$" will effect the gate from the Interface BUS IN to the A bus 100.

The PA register 2300 on 3a consists of a plurality of latches, five of which are turned ON by the coincidence of the line $PA=K582$ and each of the lines K0, K1, K2 or K3 and/or KP. The individual K lines originate in FIG. 2b from the K decode block 595. These result from the CK portion of the micro instruction word which is decoded in the K decode. Four of the five latches mentioned, which are controlled or turned on by the K lines, will result in the following four signals.

K0 will turn on the latch, the output of which is Bus Out Control 2302. The output of the latch turned on by K1 is Address Out 1621. The output of the latch turned on by K2 is Command Out 1622. The output of the latch turned on by K3 is Service Out 1623.

The output of the latch 2321 turned on by KP further conditions two AND circuits 2322 and 2323, one of which is switched with SELECT IN 1627', the other of which is switched with Multiplex Latch 2303. The output of these AND circuits are logically OR'd in circuit 2324 and turn on a second latch 2325 entitled "Poll Control," the output of which is Poll Control 2301.

A sixth latch in the PA register is turned ON by the coincidence of the lines Burst SERVICE OUT 344 and SERVICE IN 1626. The output of this latch is SERVICE IN signal PT3. The SELECT OUT signal on line 1627 goes through the I/O devices attached to the channel and, assuming no device requests service, will loop back into the channel as a SELECT IN signal on line 1627'. This signal loops back through a delay and turns off the SELECT OUT 1627 signal. SELECT OUT going OFF turns off SELECT IN and after a delay turns ON SELECT OUT again. This looping of SELECT OUT or polling of output devices continues until the particular output device interrupts the SELECT OUT line and the signal OPERATION IN returns to the channel which will also break the SELECT OUT–SELECT IN circuit.

Figure 3B:
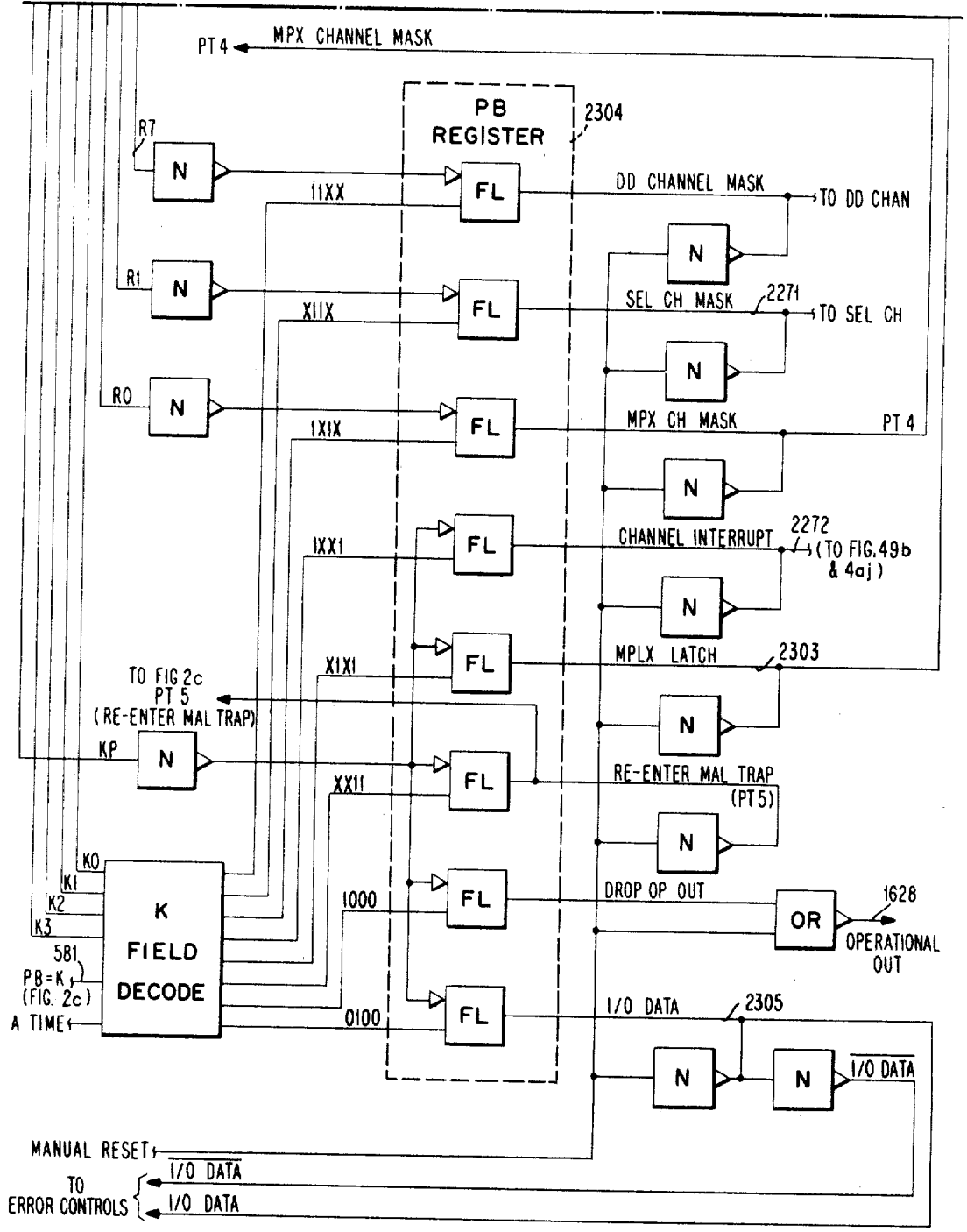

The PT lines from the channel FIGS. 3a and 3b run to FIG. 2b block 579 entitled "Gate PT to A." A signal $A=PT$ on line 579 will effect this gate of the PT lines to the A bus 100. These PT lines are as follows:

PT0, line 1624, is ADDRESS IN and comes directly from the I/O device through the interface cable.

PT1, line 2306, is Multiplex Share Request. This is generated in the channel circuitry on 3a.

PT2, line 2301, is Poll Control and is the output of the cascade of latches in the PA register previously described.

PT3 is the Service In signal generated by the latch in the PA register previously described.

PT4 is the Multiplex Channel mask and is the output of FL latch in the PB register. This will be described later.

PT5 is entitled Re-enter Mal-Trap and is also the output of an FL latch in the PB register to be described later.

PT6, line 1629, is entitled OPERATIONAL IN and comes from the I/O device across the I/O interface cable.

PT7, line 1625, is entitled Status In and also comes directly from the I/O device across the interface cable.

The PB register on FIG. 3b consists of a plurality of FL type latches. These latches require the coincidence of a negative signal on the line terminated by the arrowhead, and a positive signal on the line entering directly under the arrow head. Refer to the FL latch block 2305 I/O data for a description of operation as follows.

The arrow head input at the upper left of this block comes from the inverter which is fed from the line KP. This effectively is a $\overline{KP}$ signal. The lower line or bottom input comes from the K field decode block line 0100. Therefore, to turn on the FL latch, the output of which is entitled I/O data 2305, a signal KP in addition to the signal K2 will be required. In order to get the signal 0100 from the K field decode, three inputs are required, these being the line entitled A time, the line entitled $PB=K581$ and the line entitled K2. The remainder of the latches in the PB register are set or turned on in a like manner with the exception of the top three latches. Here the negative inputs are individually generated through three separate inverters in lines R7, R1 and R0. The latches in the PB register are set and reset from micro-program control $PB=K$, in addition to the necessary combination of the K lines from the KD decode. The outputs of these latches are then used to control various functions required during channel operation and described in the following:

Three distinct channel mask lines or conditions are stored in the first three latches. These are the Direct Data Channel Mask, Selector Channel Mask and Multiplex Channel Mask. The Direct Data Channel Mask goes to the Direct Data Channel hardware, the Selector Channel Mask line runs to the Select Channel hardware and the Multiplex Channel Mask line runs to PT4 as previously described. These mask outputs are used to generate Suppress Interrupt signals in their respective channels to prevent the I/O devices from interrupting the CPU. The fourth latch in the PB register has an output entitled Channel Interrupt 2272. The output of this latch goes to the Selector Channel controls 2275 on FIG. 5b. The next latch is entitled Multiplex Latch 2303. This latch is turned on by particular microprogram words during a share operation. At the end of the share operation this latch is reset. The output of the latch is used to signal the CPU that a Multiplex Share operation is in progress and also further conditions the Poll Control in the PA register. The next latch has an output entitled Re-enter Mal-Trap. The output of this is PT5 as previously described and signals the CPU to proceed in a certain fashion during priority controls. The next latch has an output entitled Drop OPERATIONAL OUT. This line will cause the OPERATIONAL OUT line 1628 to turn off which effectively signals the I/O device that the channel is out of operation. The turn on of this interlock line (OPERATIONAL OUT) also performs a basic reset operation within the I/O device itself. The final latch, the output of which is entitled I/O Data line 2305 is turned on during an interchange of data with the CPU to signify to the CPU that the Main Memory location being addressed is to either supply the I/O device with data or receive data from the I/O device.

GENERAL INTRODUCTION

The I/O interface provides, as illustrated in FIG. 1, a uniform method of attaching I/O control units (CU's) to channels. It consists of a set of lines which are shared time-wise to transmit all information for the operation of I/O devices. This information includes device addresses, control signals, and data. The interface can accommodate up to 8 CU's and up to 256 directly addressable I/O devices.

The multiplexing facilities of the interface permit the possibility of any number of the 256 devices to operate concurrently on a single interface; i.e., portions of various messages can be transmitted over the interface in an interleaved fashion to or from different I/O devices, or the complete message can be transmitted in a single interface operation. The operation is determined by the particular channel and the I/O CU.

Communication between the CPU and the I/O devices is established by means of the interface shown in FIGS. 1 and 3. The interface comprises a BUS OUT consisting of 8 data transmission lines and a parity line referenced 1601–1609, a BUS IN consisting of eight data lines plus parity reference 1611–1619, and ten control lines 1621 through 1630.

*Organization of information*

Information on the IN and the OUT bus is arranged so that bit position 7 of a bus always carries the lowest order bit within an 8-bit byte. The highest order bit is in position 0 and intervening bits are in descending order from position 1 to position 6.

When a byte transmitted over the interface consists of less than eight bits the bits must be placed in the highest-numbered contiguous bit positions of the bus. Thus, when a CPU or an I/O device transmits over the interface only the six bits of the BCD code, bit B is placed in bit position 2 (line 1603) of the bus, bit A in bit position 3, etc., and bit 1 is placed in position 7 (line 1608). When a CPU or an I/O device places information on or receives information from only four lines of a bus, bit positions 4, 5, 6 and 7 must be used. Any unused lines of the IN or OUT bus must include the low-numbered bit positions of the bus, i.e., bit position 0 and bit positions adjacent to it. The parity bit of any byte must appear in the parity-bit position. Unused lines must present logical zeros to the receiving end.

Command byte

When the COMMAND OUT line 1622 is up the information on BUS OUT is called the command byte. A channel issues the COMMAND OUT signal to initiate, continue, or terminate an operation in an I/O device.

Only during an INITIAL SELECTION sequence (whenever the channel addresses the device) does the command byte require decoding by the CU. At all other times the byte is zero (correct parity) even though it is not to be parity checked by the CU. The low-order bit positions indicate the type of operation, while the high-order bit positions indicate a modification code which expands the basic operation at the CU or device level.

The actual modifier codes and the particular modes set or the controls performed for them are specified in the functional description of each CU for the particular device.

The command byte is formatted as follows:

Bit Positions

| P | 0 | 1 | 2 | 3 | 4 | 5 | 6 | 7 | |
|---|---|---|---|---|---|---|---|---|---|
| 1 | 0 | 0 | 0 | 0 | 0 | 0 | 0 | 0 | Test I/O (Proceed*) Stack*) (Stop*). |
| P | M | M | M | M | 0 | 1 | 0 | 0 | Sense. |
| P | M | M | M | M | 1 | 1 | 0 | 0 | Read Backward. |
| P | M | M | M | M | M | M | 0 | 1 | Write. |
| P | M | M | M | M | M | M | 1 | 0 | Read. |
| P | M | M | M | M | M | M | 1 | 1 | Control. |

Legend: *Not decoded or parity checked by CU. M = Bits of modifie code. P = Parity bit.

Basic operation

The I/O operation to be executed over the interface is determined by the eight-bit coded command issued to the device during the initiate selection sequence.

The low-order bit positions of this command byte specify the type of operation. The high-order bit positions (modifier code) expand the basic operation at the CU or device level and do not affect the sequence on the interface of the basic operations.

The basic operations or commands are Read, Read Backward, Write, Control, Sense, and Test I/O.

The Read command initiates the execution of a data transfer from the CU to the I/O channel, and the data are obtained from the record source of the particular I/O device in operation.

The Read Backward command initiates an operation in the same manner as the Read command, except that the data bytes are transferred to main storage by the channel in the reverse order to that of a Read.

WRITE OPERATION.—The sequence of signals over the I/O interface to perform a Write operation is the same as for a Read operation. In the case of Write, the data are sent from the I/O channel to the I/O CU for recording or comparing by the selected I/O device. The operation is not initiated at the device level until the first data byte is received, i.e., not until SERVICE OUT falls in response to SERVICE IN on the first data cycle.

CONTROL OPERATION.—The control operation proceeds exactly as Write, except that the command modifier bits which are received by the I/O CU are decoded to determine which of several possible functions is to be performed. The function may be second-level addressing which may require several bytes of data to complete the Control operations. In cases where the particular control function can be completed immediately (Control Immediate) the End, Unit Freed, and other associated status may be presented during the initial selection sequence. If the Control operation is not Control Immediate, at least one data transfer cycle is necessary.

The timing in the I/O CU for the bytes transferred during a Control operation is normally such that the byte rate for this operation is no faster than the normal Read or Write for the same device. Very low speed or manually keyed devices may be executed from this restriction as determined on an individual basis. An acceptable alternate method of timing byte transfers during data interleave operation is to limit selection cycles to single byte transfers on alternate SELECT OUT signals.

SENSE OPERATION.—The Sense operation proceeds exactly as that described for Read, except that the data are obtained from status indicators rather than from a record source. The timing in the I/O CU for the bytes transferred during a Sense operation is normally such that the byte rate for this operation is no faster than the normal Read or Write for the same device. Very low speed or manually keyed devices may be excepted from its restriction as determined on an individual basis. An acceptable alternate method of timing byte transfers is the same as previously specified for Control operations.

TEST I/O.—Test I/O is a command that tests in turn the addressed CU and the addressed I/O device for outstanding status information. A particular Test I/O operation is completed at the first level that outstanding status information is encountered. If there is no outstanding status along the I/O path being tested, a zero status byte (indicating available unit) for the selected I/O device is sent to the I/O channel for processing. Once the I/O device level is reached during Test I/O and status information is waiting all outstanding status bits for the selected I/O device are transmitted to the I/O channel.

The Test I/O command may encounter a busy condition at any I/O level. In this case, a busy bit alone in the status byte is returned to the channel. It should be noted that the busy condition is defined differently with respect to Test I/O than for other programmed commands (see busy).

The signal sequence to accomplish Test I/O is nearly the same as any other Initial Selection process. The difference lies in the fact that no operation is initiated for the selected device.

Sequence controls

Sequence controls are dictated not by command but by the sequence of signals transmitted over the interface. The various sequences that may occur are listed as follows: Proceed, Stop, Stack, Suppress Data, and Suppress Status.

PROCEED.—Whenever COMMAND OUT responds to ADDRESS IN at any time other than during an Initial Selection sequence it means Proceed. Proceed indicates to the device to continue the normal servicing sequences on the interface.

STOP.—Stop is indicated by a COMMAND OUT response to a SERVICE IN signal.

Stop is used to signal the I/O device that the channel is ending the current operation. Upon receipt of the Stop signal, the I/O device must proceed to its normal ending point without sending any further SERVICE IN signals to the I/O channel. The device remains busy. It must send an End signal when it has the necessary status information available. During data operations, the COMMAND OUT is transmitted in response to SERVICE IN on the cycle after the last byte of data. If SELECT OUT is down or goes down after this sequence OPERATIONAL IN may drop on devices that cannot meet the time-out requirements as indicated later herein.

STACK.—Stack is indicated by a COMMAND OUT response to a STATUS IN. The Stack signal queues the status at the CU or device until it is accepted on a subsequent status cycle with a SERVICE OUT signal. After Stack has occurred, the initiation of status cycles is under control of the SUPPRESS OUT signal.

SUPPRESS DATA.—Suppress Data is indicated whenever SUPPRESS OUT is up during the initiation of Data cycles. Suppress Data is only specified for operations whose transmission rate can be adjusted without overrunning. Buffered and Start-Stop operations fall in this category. For these types of devices the CU is designed such that the SERVICE IN signal is not allowed to rise if the SUPPRESS OUT signal is up. Suppress Data does not apply for the first data byte of any selection sequence.

SUPPRESS STATUS.—Suppress STATUS only pertains to Attention or previously stacked status. Suppress STATUS is indicated whenever SUPPRESS OUT is up during a selection scan sequence. Suppress STATUS prevents the CU from initiating a selection sequence.

CHAINED COMMAND CONTROL.—Chained Command Control is indicated whenever the SUPPRESS OUT line 1630 is up at the time SERVICE OUT responds to STATUS IN. The Chained Command Control indicates that another command for the same I/O device will follow immediately (exact time depends on I/O channel) upon completion of current operation. No other condition, such as unit switching or Attention (busy) is allowed to interfere as long as chaining is indicated. If a Chained Command Control has been indicated on the completion of a current operation (unit freed status) the indication is valid until reselection is made or until SUPPRESS OUT falls. In addition, any reselection of any device attached to a particular CU will reset the chained command condition in the CU.

INTERFACE DISCONNECT (HALT I/O).—An Interface Disconnect is indicated whenever the ADDRESS OUT line 1621 rises or is up when SELECT OUT is down while a device is connected to the interface (OPERATIONAL IN up). The Interface Disconnect overrides the Force Burst mode. For this sequence the I/O device which is presently connected to the interface disconnects. Any mechanical motion that is in progress will continue to a normal stopping point. Any status generated is presented to the channel when appropriate. The Interface Disconnect control results from a Halt I/O instruction being executed at the I/O channel. Any abnormal device operation should be indicated by Intervention Required in the status, and the Sense information should provide additional details on the operation.

SELECTIVE RESET.—A Selective Reset is indicated whenever the SUPPRESS OUT line 1630 is up and the OPERATIONAL OUT line 1628 drops. This condition causes OPERATIONAL IN line 1629 to fall and the particular device in operation and its status to be reset. Any mechanical motion that is in progress will proceed to a normal stopping point if possible. The device which was operating over the I/O interface is the only one that is reset, even on multidevice CU's. The particular I/O device path will be in a busy state throughout this procedure.

GENERAL RESET.—A General Reset is indicated whenever the OPERATIONAL OUT line 1628 and the SUPPRESS OUT line 1630 are down concurrently. This condition causes OPERATIONAL IN line 1629 to fall, and all CU's and their attached devices to be reset, along with their status. Any mechanical motion that is in progress will proceed to a normal stopping point.

*Operational description for a complete I/O operation*

The following describes the detailed signal sequence for complete I/O operation. This includes Initial Selection, Data Transfers, and Ending procedures for the two basic modes of operation, Data Interleave mode and Burst mode.

DATA INTERLEAVE MODE.—The Data Interleave mode of I/O operation is the normal mode of operation for low-speed I/O devices. However, all I/O devices are designed to work in Burst mode when required by the I/O channel. Selector-type I/O channels Force Burst mode by holding up the SELECT OUT line after Initial Selection.

*Initial Selection (Data Interleaved).*—To initiate any I/O operation, the channel places the address of the desired device on BUS OUT and then raises the ADDRESS OUT line 1621. Each I/O CU connected to the channel attempts to decode the given address. The address must have correct parity to be recognized and only one CU should be able to recognize any given address on the same interface. When ADDRESS OUT line 1621 is up and the incoming SELECT OUT line rises, the selected CU raises the OPERATIONAL IN line.

If the channel is designated to proceed in Data Interleave mode, it will drop SELECT OUT line 1627 during the Initial Selection sequence. On the other hand, a CU by holding up OPERATIONAL IN line 1629 can force the channel to operate in Burst mode. After the ADDRESS OUT line 1621 falls, the unit address is placed on BUS IN accompanied by a signal on ADDRESS IN line 1624. After the channel has checked the address, it responds by placing the command on BUS OUT and signaling on the COMMAND OUT line 1622. The selected CU then replaces the address with status information on BUS IN and replaces the ADDRESS IN signal with a STATUS IN signal. The OPERATIONAL IN line remains up throughout this operation. The status information informs the channel that the command was accepted or rejected. If the channel accepts this status with SERVICE OUT, and the SELECT OUT line is down at the CU, OPERATIONAL IN drops unless the CU is forcing Burst mode. This ends the Initial Selection phase after having established the desired connection between the channel and one of its CU's and I/O devices. If the CU sent an Intervention Required 1617 with its STATUS IN to the channel, as for instance after an invalid command, the channel if it accepts this status responds with a SERVICE OUT tag line 1627. In case the channel cannot handle this status, COMMAND OUT line 1622 will respond to STATUS IN and the status is stacked as described later on with the ending procedure.

The channel will disconnect and serve other I/O demands while the selected I/O CU prepares for transfer of the required data to or from the channel.

If the device path is busy operating, the CU responds with busy bit alone in the status byte. If the CU has outstanding status it responds with a busy bit (indicating a Busy reject to the new command) plus the outstanding status. If the command is Test I/O and the device path is not busy a busy bit is not included with the status since the Test I/O command is not rejected. If the device path is free the CU presents zero status. If the command is a control command which could be specified and executed with the information contained in the command byte and could immediately free up both the channel and the CU, then the CU can respond with End status at this time.

*Data Transfer (Data Interleaved).*—When the selected I/O device requires service, the operation is as follows: The next time SELECT OUT rises at the CU and no I/O selection is being attempted by the channel, the CU places the device address on the BUS IN, and signals on both the ADDRESS IN line 1624 and OPERATIONAL IN line 1629. In Data Interleave mode, the SELECT OUT line 1627 from the channel will fall after ADDRESS IN line 1624 rises. When the channel has recognized the address and is prepared to send or receive the data, a COMMAND OUT signal is sent to the CU which indicates Proceed. The CU then replaces the device address on BUS IN with the input data required, if reading or sensing, and drops the ADDRESS IN line 1624 and raises the SERVICE IN line 1626. If writing or controlling, the action is the same except nothing is on BUS IN. When the channel has accepted the input data or has output data available, it responds to the CU with a SERVICE OUT signal 1623. The CU then drops the SERVICE IN line and the OPERATIONAL IN line if the SELECT OUT line is down at the CU. The SERVICE OUT signal drops after the SERVICE IN or OPERATIONAL IN drops at the channel. The channel then raises the SELECT OUT line 1627 in search of another I/O CU requiring service.

The above procedure is repeated for each new byte of data until the end of the operation is reached.

*Ending Procedure (Data Interleaved).*—The ending procedure may be initiated by either the I/O device or the I/O channel. If the procedure is initiated by the I/O device, the end of operation is completed in one signal sequence. If the procedure is initiated by the I/O channel, the I/O device may still require time to reach the point where the proper status information is available, in which case a second signal sequence is necessary to complete the ending procedure. One of three situations may exist at the initiation of the Ending procedure.

(1) The I/O channel recognizes the end of an operation before the I/O device reaches its ending point. In this situation, whenever the I/O CU next requires service, it obtains selection and raises its ADDRESS IN line 1624 to prepare for the data transfer. The I/O channel responds with COMMAND OUT line 1622 which indicates proceed. The I/O CU raises the SERVICE IN line 1626 after COMMAND OUT line 1622 falls. The I/O channel responds with COMMAND OUT, which indicates stop. The I/O CU drops SERVICE IN line 1626 and proceeds to its normal ending point without requesting further service. When the I/O device reaches its normal ending point, the CU obtains selection and raises the ADDRESS IN line 1622. The I/O channel responds with COMMAND OUT. When COMMAND OUT falls, the I/O CU places the status (including end) on BUS IN and raises the STATUS IN line. The I/O channel responds with SERVICE OUT, unless it is necessary to stack the status. This then terminates the Data Interleave operation, causing the channel to go on with periodic scanning.

(2) The I/O channel and the I/O device recognize the end of an operation simultaneously.

(3) The I/O device recognizes the end of an operation before the I/O channel reaches the end.

For situations 2 and 3 above, which may exist at the initiation of the Ending procedure, all status information is available at the I/O CU. The signal sequence is the same as previously described when the I/O device reaches its normal Ending point.

*Stack Status (Data Interleaved).*—In case it is necessary to queue status information, the I/O channel responds to STATUS IN with COMMAND OUT. COMMAND OUT causes the CU to stack or queue that status. The status remains stacked as long as SUPPRESS OUT is up. When SUPPRESS OUT is down, the CU sends STATUS IN at each opportunity until it is accepted (SERVICE OUT).

BURST MODE.—The Burst mode of I/O operation is the normal mode of operation for high-speed I/O devices. These devices force Burst mode (by holding up the OPERATIONAL IN line) when attached to channels which normally operate in the Data Interleave mode (multiplex channels), medium-speed I/O devices which may normally work in either mode, as determined by channel data rate capabilities, are equipped with a manual switch to select the proper mode of operation. The switch setting will be overridden when Burst mode is forced by the I/O channel. An Interface disconnect sequence overrides the Force Burst mode condition of a CU.

*Initial Selection (Burst Mode).*—An Initial Selection procedure is nearly the same for Burst mode as previously described for Data Interleave mode. The difference is that if the channel is designed to operate in Burst mode, it will not lower SELECT OUT line 1627 after OPERATIONAL IN line 1629 rises. SELECT OUT remaining up keeps the CU connected to the channel and no further addressing is required for data transmission as long as SELECT out remains up. The selected CU will hold up its OPERATIONAL IN line 1629 as long as SELECT OUT is up. If the CU is designed for Burst mode, it will hold up the OPERATIONAL IN effecting the same result.

*Data Transfer (Burst Mode).*—In Burst mode no address is necessary for data transmission to or from the channel. When a byte of data is ready for transmission to or from the I/O channel, a SERVICE IN signal on line 1626 is sent to the channel and the data is placed on BUS IN if this is an input operation. When the channel has accepted the input data or has data available for output, data is placed on BUS OUT, and the channel sends a response on the SERVICE OUT line 1623. This procedure is repeated for each byte of data as long as the OPERATIONAL IN line remains up.

*Ending Procedure (Burst Mode).*—The Ending procedure is nearly the same as described under ending procedure for Data Interleave mode, except that no addressing is required to initiate the Stop sequence control. If SELECT OUT line 1627 is down or dropped after the receipt of the stop signal, the CU can disconnect from the interface by dropping OPERATIONAL IN. In this case the End status is presented to the channel as described for Data Interleave mode.

Otherwise if OPERATIONAL IN line 1629 remains up at the CU when the device reaches its ending point, the CU presents its end status to the channel, and if the channel accepts this status, the latter responds with SERVICE OUT, OPERATIONAL IN drops if SELECT OUT is down. This terminates the I/O operation, freeing the device for a new selection.

*Stack Status (Burst Mode).*—If any status information cannot be handled, the channel will respond with COMMAND OUT instead of SERVICE OUT which causes a stack of the status in the CU. If SELECT OUT drops before COMMAND OUT drops the CU drops OPERATIONAL IN, disconnecting from the interface. If on the other hand, SELECT OUT remains up, the CU repeats sending in its status.

EXTERNALLY INITIATED STATUS.—In previous descriptions any status information to the I/O channel resulted from some previously initiated command. There also exists two externally initiated status sequences, which are unrelated to any previous program initiated command. The first of these is Attention which is normally found on console or communication devices. The other externally initiated status sequence is generated whenever the corresponding I/O device goes from the not ready to the ready state ("Not ready" here always means that a device is mechanically not ready and can be placed in a ready state by operator intervention. The not ready condition could occur due to the following actions: (1) load/unload conditions on magnetic tape, (2) car equipment out of cards or stacker full, (3) printer out of paper, and (4) error conditions which need operation intervention.) The condition is defined for each I/O device and expressed in the sense information.

*Status*

STATUS BYTE FORMAT.—When the STATUS IN line 1625 is up, the information appearing on BUS IN is called the status byte. It has the following format:

Bus position:
```
P ---------------------- Parity.
0 ---------------------- Attention.
1 ---------------------- Jump.
2 ----------------------
3 ---------------------- Busy.
4 ---------------------- End.
5 ---------------------- Unit Freed.
6 ---------------------- Intervention Required.
7 ---------------------- Exceptional Condition.
```

The status byte is transmitted to the I/O channel in five different situations: (1) during the Initial Selection process in response to COMMAND OUT; (2) to present the Ending status at the termination of the data transmission; (3) to present the Unit Freed signal and any associated conditions to the I/O channel; the device remains busy until the I/O channel accepts the Unit Freed status; (4) to present the Attention signal to the I/O channel; and (5) to present again any previously rejected status when allowed to do so.

STATUS BITS.—The condition under which each type of CU generates the specific Status bit is defined in the functional objectives for the CU. The bits are defined as follows:

*Attention.*—The Attention bit indicates that some asynchronous condition has occurred, as defined for the particular I/O device. The Attention cannot cause a busy reject to a new command if chaining is indicated (refer to Chained Command Control). For devices which share more than one channel path the Attention status will be presented to the channel or chanels as defined in the functional specification for that particular device.

*Jump.*—A Jump bit with a Unit Freed bit at the termination of an operation indicates that the operation was successfully performed under the condition specified in the original command byte. The jump bit indicates to the channel to jump over the next chained command. The channel will perform this function only if all channel conditions are met. The Jump bit occurs only for operations which have been specifically commanded to provide this Jump Bit indication. The condition under which a device indicates this Jump condition is specified in the functional specification for that particular device.

*Busy.*—The Busy bit occurs only during an initial selection sequence and indicates that either the I/O CU or device is not available for the initiation of a new command because of a previously initiated operation or because of outstanding status.

The availability for the initiation of a new command depends in certain cases upon whether or not the new command is Test I/O. The following situations illustrate the busy condition for a particular I/O device: (1) after initiation of any command and before End occurs—busy to all new commands (Busy bit alone); (2) after End is presented but End has not been accepted by the I/O channel—new commands, except Test I/O (Busy bit plus end statue)—Test I/O (end status); (3) after end has been accepted by the I/O channel but Unit Freed has not occurred—busy to all new commands (busy bit alone); (4) Unit Freed has been generated but either has not yet been sent to I/O channel or has been rejected by channel—new commands except Test I/O (busy bit plus Unit Freed status)—Test I/O (Unit Freed status); (5) dual-interface CU switched to a particular interface—busy to all new commands over unselected Interface (Busy bit alone); (6) switchable I/O device selected to a particular CU—busy to all commands via CU to which device is unselected (Busy bit alone); and (7) Attention (no chaining) has been generated and has not been accepted by the I/O channel—new commands except Test I/O (Busy bit plus Attention status)—Test I/O (Attention status).

*End.*—The End bit indicates that the selected I/O device may now be disconnected from the Interface thus freeing the channel for operations on other devices. The I/O device remains busy until its Unit Freed signal has been accepted by the channel.

*Unit Freed.*—The Unit Freed bit indicates that the I/O device has completed or terminated any operation, or the device has noted a not ready to ready transition. A device which is shared between more than one channel path and has a Unit Freed bit generated due to the device going from the not ready to the ready state must present a Unit Freed status byte to all channels which selected the device while the device was in the not ready state.

*Intervention Required.*—The Intervention Required bit indicates that the command cannot be executed or that the operation, while being executed, detected a condition which requires either manual or programming intervention.

The Data Check bit indicates that the I/O CU or the device has discovered an error in the data sent to or from the I/O device, or that one or more bytes of data have been lost due to overrun.

A sense operation is required to find out the reason for the Intervention Required status. Sense information should distinguish hardware- and programming-type error whenever possible.

*Exceptional Condition.*—The Exceptional Condition bit indicates that a condition which does not usually occur has been discovered. However, this may be a normal condition such as recognition of a tape mark. Exceptional Condition has only one meaning for any given I/O device and a particular command.

BUS OUT

BUS OUT is a set of nine lines 1601 to 1609 from the channel to all attached I/O control units. It is used to transmit address, commands, and data to the CU's. BUS OUT consists of eight information lines plus one line for odd parity.

The type of information that is transmitted over BUS OUT is indicated by the outbound tag lines. When ADDRESS OUT line 1621 is up during the initial selection sequence, BUS OUT specifies the address of the I/O device in which the I/O channel wants to initiate an operation. When COMMAND OUT line 1622 is up during the initial selection sequence, BUS OUT specifies a command. When SERVICE OUT is up and it has been raised in response to SERVICE IN during the execution of a Write or Control operation, BUS OUT contains information whose nature depends upon the type of operation. For example, during a Write operation it contains data that is recorded by the I/O device. During a Control operation it can specify an order code or an address within the I/O CU or device.

The period during which information on BUS OUT is valid is controlled by the tag lines. During the transmission of the address of an I/O device, the information on the bus is valid from the rise of ADDRESS OUT line 1621 until the rise of OPERATIONAL IN line 1629 or SELECT IN line 1627. When the channel is transmitting any other type of information, the information on the bus is valid from the rise of the signal on the associated outbound tag line until the fall of the signal on the corresponding inbound tag line. In all above cases the validity of information on BUS OUT, and the timing of the signals on inbound and outbound tag lines, is measured at the cable connectors at the I/O channel.

The skew on BUS OUT must be accommodated by the channel. The channel must delay raising of the signal on the outbound tag lines by an amount which insures that the information on BUS OUT will precede the signal on the outbound tag lines by not less than 100 nsec. when measured at the cable connectors at the channel under the worst-case skew conditions. The channel thus must provide a delay which accommodates skew caused by its own circuitry and in addition must be provide a delay of at least 100 nsec. for eliminating skew caused by the cable. For most CU's this time will also be sufficient to accommodate the skew caused by the interface receivers. When a CU can cause more skew, the CU must provide the additional delay to eliminate it.

BUS IN

BUS IN is a set of nine lines 1611 to 1619 including parity from all attached I/O CU's to the channel. It is used to transmit address, status, and data to the channel. An I/O CU can place and maintain information on BUS IN only when its OPERATIONAL IN line 1629 is up.

The type of information that is transmitted over BUS IN is indicated by the inbound tag lines. When ADDRESS IN line 1624 is up, BUS IN specifies the address of the I/O device that is currently selected. When STATUS IN line 1625 is up, BUS IN contains a byte of information which describes the status of the I/O device. When SERVICES IN line 1626 is up during the execution of a Read or Sense operation, BUS IN contains information whose nature depends upon the type of operation. During a Read operation it contains a byte of data from the recorded medium. During a sense operation, the bus contains a set of bits that describe the detailed status of the device and the conditions under which the last operation was terminated.

The period during which information on BUS IN is valid is controlled by the tag lines. Information on the bus becomes valid 100 nsec. after the rise of the associated inbound tag and must stay valid until the rise of the responding outbound tag. In either case the validity of information on the bus and the timing of the signals on the inbound and outbound tag lines are measured at the cable connectors at the I/O channel. The 100 nsec. delay between the time the signal becomes valid on BUS IN and the rise of the inbound tag places the responsibility of deskewing bus in on the channel. The channel must provide a delay in the inbound tag lines which accommodates skew caused by the channel circuitry and in addition must provide a delay of at least 100 nsec. for eliminating skew caused by the cable, the interface drivers, and some CU logic. For most CU's this will provide sufficient time to deskew the information so that the inbound tag can be raised by the CU concurrently with placing the information on the bus. When a CU can cause more skew, it must provide the additional delay to eliminate it.

OPERATIONAL OUT

OPERATIONAL OUT line 1628 is a line from the channel to all attached I/O CU's and is used for interlocking purposes. Except for the SUPPRESS OUT lines all lines from the channel are significant only when OPERATIONAL OUT is up. Whenever OPERATIONAL OUT drops, all in lines from the CU must drop and the particular operation must be reset.

The downstate of both the SUPPRESS OUT and the OPERATIONAL OUT signals is used to reset all attached I/O devices. Unless the I/O device is in an offline mode, any downstate of both these signals of sufficient duration to cause a response from the circuitry of the device provides the reset. The meaning of the reset is part of the specifications for the I/O device. To insure a proper reset, the OPERATIONAL OUT and SUPPRESS OUT line must both be down concurrently for at least 6 μsec.

ADDRESS OUT

ADDRESS OUT line 1621 is a line from the channel to all attached I/O CU's. It provides two functions:

(1) ADDRESS OUT is used to initiate selection of an I/O device. The ADDRESS OUT line signals to the I/O CU to decode the address on BUS OUT. The I/O CU that recognizes the address must respond by raising its OPERATIONAL IN line when its incoming SELECT OUT rises. ADDRESS OUT precedes the rise of SELECT OUT by a minimum of 250 nsec.

The address of an I/O device can be placed on BUS OUT only when SELECT OUT and OPERATIONAL IN are down at the channel. Ultimate use of the address on BUS OUT at the I/O CU is timed by the next rise of SELECT OUT at the addressed CU. The ADDRESS OUT line must rise after the address has been placed on BUS OUT. See BUS OUT for discussion of skew. It must stay up until either SELECT IN or OPERATIONAL IN rises. ADDRESS OUT cannot be up concurrently with any other outbound tag line.

(2) ADDRESS OUT is used to disconnect operations from the interface. The ADDRESS OUT line along with the down level of the SELECT OUT line signals the I/O device which is presently connected to drop its OPERATIONAL IN line, thus disconnecting from the interface. ADDRESS OUT remains up until OPERATIONAL IN drops. OPERATIONAL IN must drop within 6 μsec after receiving the Interface Disconnect indication. Any mechanical motion in process continues to a normal stopping point. Status will be generated and presented to the channel when appropriate.

SELECT OUT

SELECT OUT line 1627 is a line from the channel to the I/O CU having highest priority and from any CU to the CU next lowest in priority. This line together with the SELECT IN line provides a loop for scanning of the attached I/O CU's. An I/O CU can raise its OPERATIONAL IN line only at the rise of its incoming SELECT OUT signal. If a CU does not need selection, it must immediately propagate the signal to the next CU. Once a CU has propagated SELECT OUT, it cannot raise its OPERATIONAL IN line until the next rise of the incoming SELECT OUT line.

When an operation is being initiated by the I/O channel, the rise of ADDRESS OUT must precede the rise of SELECT OUT by a minimum of 250 nsec.

When the channel is scanning the attached I/O CU's, the SELECT OUT line emanating from the channel is normally up. The channel must keep the SELECT OUT line up until either SELECT IN or ADDRESS IN rises. When SELECT IN rises, SELECT OUT must drop and may not again rise until SELECT IN falls. When an I/O CU becomes selected, it raises its OPERATIONAL IN line. SELECT OUT must drop in order that OPERATIONAL IN may drop. However, after the drop of SELECT OUT the I/O CU must keep OPERATIONAL IN up until the current signal sequence is complete. For Burst mode, the channel will keep the SELECT OUT line up, normally until the end of the operation. A rise of the incoming SELECT OUT in an I/O CU signals that the CU can become selected to the chanel by raising its OPERATIONAL IN line. If a CU raises its OPERATIONAL IN line, it must suppress the propagation of SELECT OUT to the next CU. If the CU does not desire selection, it must propagate SELECT OUT to the next CU immediately.

SELECT IN

SELECT IN line 1627' is a line from the lowest priority CU to the channel. It is the outgoing SELECT OUT line of that CU and provides for the SELECT OUT signal a return path to the channel. The definition of the SELECT IN line is the same as that of a SELECT OUT line emanating from any I/O CU.

OPERATIONAL IN

OPERATIONAL IN line 1629 is a line from all attached I/O CU's to the channel, and is used to signal to the channel that an I/O device has been selected. It must gate all IN lines at the CU except the SELECT IN line. It, therefore, must stay up for the duration of the selection. The I/O device that is selected is identified by the address byte transmitted over BUS IN.

The rise of OPERATIONAL IN indicates that an I/O device is in communication with the channel. This communication can consist of one or a combination of the following signal sequences—response to address on BUS OUT, request for data on BUS OUT, offer of data on BUS IN or offer of status.

OPERATIONAL IN can rise only when the incoming SELECT OUT to the CU is up and the outgoing SELECT OUT is down. OPERATIONAL IN can drop only after SELECT OUT drops.

Once it is up for a particular signal sequence, OPERATIONAL IN must stay up until all required information has been transmitted between the channel and the I/O device. OPERATIONAL IN must drop at the time or after the outbound tag associated with the transfer of the last byte of information rises if SELECT OUT is down. For Burst mode devices OPERATIONAL IN can drop if SELECT OUT is down or drops after the receipt of the stop signal sequence control.

The signals on BUS IN and on the inbound tag lines are significant only when OPERATIONAL IN is up. When OPERATIONAL IN is down the channel must disregard any signals on these lines. On the other hand, each I/O CU must provide interlocks to insure that it does not place any signals on BUS IN and the incoming tag lines unless its OPERATIONAL IN line is up.

ADDRESS IN

ADDRESS IN line 1624 is a line from all attached I/O CU's to the channel and is used to signal to the channel when the address of the currently selected I/O device has been placed on BUS IN. The channel responds to ADDRESS IN by means of COMMAND OUT.

The rise of ADDRESS IN indicates that the address of the currently selected I/O device is available on BUS IN. See BUS IN for discussion of skew. ADDRESS IN must stay up until the rise of COMMAND OUT. ADDRESS IN must fall in order that COMMAND OUT may fall. ADDRESS IN cannot be up concurrently with any other inbound tag line.

COMMAND OUT

COMMAND OUT line 1622 is a line from the channel to all attached I/O CU's and is used to signal to the selected I/O device in response to a signal on the ADDRESS IN, STATUS IN or SERVICE IN lines. A signal on the COMMAND OUT line indicates to the selected I/O device that the channel has placed a Command byte on BUS OUT. The Command byte has a fixed format.

COMMAND OUT must rise after the channel has accepted the information, if any, on BUS IN and has placed the command byte on BUS OUT. It indicates that the information on BUS IN is no longer required to be valid on BUS IN and indicates that a Command byte is available on BUS OUT. See bus out for discussion of skew. COMMAND OUT must stay up until the fall of the associated ADDRESS IN, STATUS IN or SERVICE IN signal. It cannot be up concurrently with any other outbound tag line.

When COMMAND OUT responds to ADDRESS IN, during an Initial Selection sequence, the Command byte contains the operational command to be performed. At any other time, a COMMAND OUT response to ADDRESS IN means proceed. COMMAND OUT response to SERVICE IN always means stop. A COMMAND OUT response to STATUS IN means stack, which indicates that the I/O CU is to hold its interruption conditions and to present them again when COMMAND OUT drops, if SELECT OUT is still up and SUPPRESS OUT is down, or as soon as it can obtain selection when SUPPRESS OUT is down.

STATUS IN

STATUS IN line 1625 is a line from all attached I/O CU's to the channel and is used to signal the channel when the selected I/O device has placed status information on BUS IN. The status byte has a fixed format and contains bits that describe the current status at the I/O CU. The channel responds with either SERVICE OUT or COMMAND OUT dependent upon whether or not it accepted the status.

The rise of STATUS IN indicates that a byte of status information is available on BUS IN. See BUS IN for discussion of skew. STATUS IN cannot be up concurrently with any other inbound tag line. STATUS IN must stay up until the rise of SERVICE OUT or COMMAND OUT. It must fall in order that the responding out tag may fall.

SERVICE OUT

SERVICE OUT line 1623 is a line from the channel to all attached I/O CU's and is used to signal the selected I/O device in recognition of a signal on the SERVICE IN, or STATUS IN line. A signal on the SERVICE OUT line indicates to the selected I/O device that the channel has accepted the information on BUS IN or has provided on BUS OUT the data as requested by SERVICE IN.

When SERVICE OUT is sent in response to SERVICE in during Read, Read Backward, or Sense, or to STATUS IN, the SERVICE OUT signal must rise after the channel has accepted the information on BUS IN. In these cases the rise of SERVICE OUT indicates that the information is no longer required to be valid on BUS IN, and is not associated with any information on BUS OUT. When SERVICE OUT is sent in response to SERVICE IN during a Write or Control operation, the rise of SERVICE OUT indicates that the channel has provided the requested information on BUS OUT. In this case the signal must rise after the information has been placed on the bus. See BUS OUT for discussion of skew. The information on BUS OUT is always of the type that is requested by SERVICE IN, and is used in the process of executing the current operation. SERVICE OUT must stay up until the fall of the associated SERVICE IN or STATUS IN signal. It cannot be up concurrently with any other outbound tag line.

A SERVICE OUT response to STATUS IN while SUPPRESS OUT is up indicates to the CU that the operation is being chained. See SUPPRESS OUT for further details.

SERVICE IN

SERVICE IN line 1626 is a line from all attached I/O CU's to the channel and is used to signal to the channel when the selected I/O device wants to transmit or receive a byte of information. The nature of the information associated with SERVICE IN depends upon the operation and the I/O device. The channel must respond to SERVICE IN by means of either SERVICE OUT or COMMAND OUT.

During Read, Read Backward, and Sense operations SERVICE IN rises when information is available on BUS IN. See BUS IN for discussion of skew. During Write and Control operations SERVICE IN rises when information is required on BUS OUT. It cannot be up concurrently with any other inbound tag line. SERVICE IN must stay up until the rise of either SERVICE OUT or COMMAND OUT, whichever occurs first. It can only fall after the rise of either of these signals.

When, in the case of cyclic I/O devices, the channel has not responded in time to the preceding SERVICE IN, thus creating an overrun, the I/O device must recognize this condition. In any case the SERVICE IN must not drop if SERVICE OUT has not risen, nor may it rise if SERVICE OUT has not dropped. See signal interlock.

An overrun condition causes the data check indicator and the overrun indicator to be set. Whether data transfers are to stop or continue after an overrun condition will be specified for each type of I/O device in the functional specifications for the device. For cyclic I/O devices, the maximum allowable time interval between the rise of SERVICE IN and the rise of the responding SERVICE OUT or COMMAND OUT must be part of the device specification.

For buffered type devices where the data rate can be adjusted without an overrun, a further restriction is placed upon the SERVICE IN line. For these devices the SERVICE IN line cannot rise unless SUPPRESS OUT is down. See SUPPRESS OUT for further definition.

SUPPRESS OUT

SUPPRESS OUT line 1630 is a line from the channel to all attached I/O CU's and is used both alone and in conjunction with the out tag lines to provide the following special functions:

(1) Suppress status—when suppress out is up, attention or status information that has been previously stacked in a CU (COMMAND OUT response to STATUS IN) are suppressed and no further attempt is made to present the status information to the channel as long as suppress out is up. If SUPPRESS OUT rises after a status cycle has started, the status cycle signal sequence proceeds normally without regard to SUPPRESS OUT.

(2) Suppress data transfer—for noncyclic I/O devices (e.g., buffered devices) which can wait for data transfers without overrun, the SERVICE IN line cannot rise if SUPPRESS OUT I/O devices which can overrun ignore the SUPPRESS OUT signal on data transfers. SUPPRESS OUT must rise 100 nsec. before the previous SERVICE OUT tag drops in order to insure supressing subsequent data.

(3) Chained command control—if SUPPRESS OUT is up when the SERVICE OUT responds to STATUS IN a chained command is indicated. If the SUPPRESS OUT is up for a Unit Freed status, it indicates chaining only until the SUPPRESS OUT line falls or reselection is made. SUPPRESS OUT must rise 100 nsec. before SERVICE OUT.

Depending upon the particular device, the operation and the configuration, the chained command indication requires certain functional control at the CU level.

If chaining is indicated at End status (Unit Freed outstanding) on a multidevice CU the selected devices must be the next one to return its Unit Freed status unless the CU is addressed in the meantime. SUPPRESS OUT must rise at least 100 nsec. before SERVICE OUT responds and must remain up until at least SERVICE IN drops.

If chaining is indicated on a device that is shared between more than one CU or channel the device must remain available until the chaining operation has been initiated or chaining is no longer indicated.

(4) Selective reset—when SUPPRESS OUT is up whenever OPERATIONAL OUT drops only the device in operation on the interface resets. See OPERATIONAL OUT. For this sequence SUPPRESS OUT must rise at least 250 nsec. before OPERATIONAL OUT drops and must remain up until at least 250 nsec. after OPERATIONAL OUT rises. See OPERATIONAL OUT for further description.

CLOCK OUT

The CLOCK OUT line is used only between the CPU and an intermediate unit, or between an intermediate unit and a sub-intermediate unit. It carries the signal that indicates when the CPU is halted or waiting and, thus, when the intermediate unit may change from the enabled state to the disabled state, or vice versa.

METERING IN

The METERING IN line is used only between the CPU and an intermediate unit, or between an intermediate unit and a sub-intermediate unit. This signal is passed through to the CPU cluster, and when present causes the CPU cluster meter to accumulate time even though the CPU may be halted or waiting.

METERING OUT

This line goes to all units and devices to condition their meters to run. The signal is present whenever the CPU customer meter is running.

Input-output device direct addressing

The method of I/O device addressing now to be described applies to all directly addressable I/O CU's and devices attached via the I/O interface. The method of addressing over the I/O interface is relatively independent of the I/O channel selection scheme used by the CPU.

An eight-bit address byte (plus parity) is used over the I/O interface for direct addressing of attached I/O devices. It should be noted that a unique eight-bit device address will be assigned to each device "access path" at the time of installation of I/O CU's. The term "access path" is used since a particular I/O device may be reached via more than one path in some systems or more than one device may be reached via the same path with indirect addressing.

Input-output CU's must be capable of recognizing device addresses under the following rules: (1) device addresses must have correct parity; (2) device addresses will be assigned in sequence to multidevice control units; (3) any device address from 0 to 255 may be assigned to single-device address CU's; (4) device addresses for multidevice CU's will always start at an address boundary as previously defined—example—a CU with two device access paths can be assigned any starting device address that has a zero in the low-order bit position; (5) control units must not recognize more device addresses than they have been designed to handle—example—a CU designed to handle ten I/O device access paths must recognize addresses 0000–1001 in the four low-order bit positions, but must reject addresses 1010–1111 in these four bit positions; (6) control units with more than sixteen device addresses may be designed to recognize addresses in multiples of sixteen.

In the description of the application particularly as it is directed to the micro instruction words which are used to perform all the operations claimed herein, reference is made to alphabetic instruction words and occasionally to page numbers in excess of 1000. As mentioned previously the micro instruction words are fully contained in the above-mentioned Amdahl et al. application in an appendix starting at page 1 and proceeding for some 1500 pages.

In this appendix is a complete listing of all the micro instruction words used in the data processing machine. Each one of the instruction words in that appendix is printed with all the control values necessary to perform the functions listed beneath the control words.

Further in this appendix is listed a number of representative operations which the machine is capable of carrying out based on certain assumed values and conditions within the machine at the time the operation is required. As mentioned previously in the general description, the Amdahl application contains a very large number of flow chart drawings illustrating all possible micro instruction word steps resulting from said conditions. Flow charts, though not contained as such in the present application are hereby incorporated by reference. Some of the operations relative to the input-output of the above-mentioned central processing unit described in the Amdahl et al. application and listed in the appendix are "Start I/O," beginning on page 1401 and continuing to page 1426; "Multiplex Share Operation" from page 1426 through page 1446; "Halt I/O Operation" from page 1461 through 1466; "Start I/O Selector Operation" from page 1467 through 1482; "Test I/O Operation" from page 1447 through 1460.

In the present application the routines of selecting an I/O device on either the selector channel or the multiplex channel have been described in narrative form. Further than that the operation of multiplex share is also given in a narrative form. In the latter part of the present application is contained two illustrative examples of chaining data addresses and command chaining. Each one of the features is listed as to the alphabetic designation of the micro instruction word. The micro instruction word per se has not been included but is found in the aforementioned Amdahl et al. application. With each micro instruction word some comment may be added to aid in the understanding of exactly what is occurring in the machine.

Multiplex Channel

The Multiplex Channel handles units with addresses (8 bits) of 0XXX XXXX or 10XX YYYY (where X and Y may be any binary value). All units attached to this channel must maintain this format. The basic version of the channel provides only for 32 unit addresses so that the above addressing structure is further appended to addresses 000X XXXX or 10XX YYYY for this version.

The above mentioned limitation is a result of the requirement to store, for each operating unit, a running record of the operation being performed. As each device requests service, its record is brought out to the channel hardware, used, updated, and, when the required operation has been completed, restored. These records are called Unit Control Words and consist of 64 bits in 8 contiguous byte locations in an appendage to the main memory called the UCW memory. The System provides 256 byte storage locations in the UCW memory. This provides 256/8=32 UCW's in the basic multiplex channel.

For Multiplex Channel operation, the CPU and the ROS are used to perform the multiplex function whenever an I/O device requires service or the channel must perform some housekeeping function. In effect, the CPU is transformed into the channel to provide the function requested and then is restored to its original role as CPU when finished. Since micro-control of CPU hardware exists for the CPU function and is flexible, very little extra structure is necessary to provide the channel function. The "extra" hardware consists of the following equipment:

(1) An outbound data path lines 1601-1609, FIG. 3a from "R" 139, FIG. 2c, gated to the Interface Bus Out (8 Data+parity).

(2) An inbound data path lines 1611-1619 gated to the "A" register 130, FIG. 2c, from the Interface Bus In (8 data+parity).

(3) A second inbound data path gated from some selected lines in the channel, including the four inbound Interface Tag lines to the A Register (8 total lines—no parity).

(4) Two latch registers (one with 5 overriding set latches called PA 2300, FIG. 3a, and one with 6 "Exclusive-Or" conditional set-reset latches called PB 2304, FIG. 3b) which may be set under control of the ROS to conditions specified by bits of the "K" Field output.

(5) An interface polling circuit 2301 which acts as a delay-line oscillator.

(6) A parity check circuit on the Interface BUS IN lines.

This apparatus is shown in FIGS. 3a and 3b.

General description of multiplex channel start I/O

The CPU comes to a Start I/O Instruction in the instruction stream of the Monitor Program and the following sequence of steps occur.

START I/O INSTRUCTION

| 8 | 8 | 16 | |
|---|---|---|---|
| OP | Unit Addr | B | 0 |

The Unit Address bits of the Start I/O Instruction are examined and it is determined that the unit address is one of those on the Multiplex Channel (either 0XXX XXXX or 10XX YYYY).

From the specified Unit Address is manufactured the address of corresponding Unit Control Word in the UCW Memory.

UNIT CONTROL WORD

| 8 | 8 | 16 | 16 | 16 |
|---|---|---|---|---|
| Stat OS | Flgs & OP | | | |

The Status Byte and Op-Flag byte of this UCW are then examined to determine the availability of the addressed unit. If there is no indication that the unit is in use, access is made to a Channel Command Word at a location specified in the Start I/O Instruction. This address is that of the Op byte of the Channel Command to be performed and this Op is sent (all eights bits) via the Interface BUS OUT to the selected unit, in a sequence of control signals and answering responses over the interface.

CHANNEL COMMAND WORD

| 8 | 4 | 20 | 8 | 24 |
|---|---|---|---|---|
| OP | | Count | Figs | Data Addr |

At the complete of thes selection sequence, the channel is able to tell, from the responses of the unit, whether there are any improper conditions which prevent the required operation from being initiated. If not, it proceeds to generate and store a 64-bit Unit Control Word for the unit.

UNIT CONTROL WORD

| 8 | 8 | 16 | 16 | 16 |
|---|---|---|---|---|
| Stat OS | Flgs & OP | Count | Data Addr | New CCW addr |

The UCW is stored in eight sequential byte locations in UCW Memory beginning with a location whose three low order address bits are zero (called double word boundaries). All the bytes of a single UCW are thus contained within eight byte blocks of UCW Memory whose high order 5 (of 8) address bits are alike. Selection of any of the bytes of a single UCW is accomplished by appending these 5 "base address" bits with the proper three low order "byte address" bits to select the section of the UCW desired.

During the formation and storage of a UCW, the UCW status byte is set to zeros, the CCW Op and Flag bytes are merged and stored as the UCW Op byte, and the three count, data address, and next command address fields are extracted and set into their corresponding locations in the UCW. Since these latter three fields are shorter than their CCW and Start I/O counterparts, the Start I/O execute micro-control words checks to assure that no significant count or address bits are present above 16 low order bits.

Any error detected by the micro-program in the course of the execute half of the Start I/O Instruction is registered by setting appropriate condition bits of an active program Status Word PSW. In the event that such an error is detected, the I/O operation *is not performed* and the program continues to the next CPU instruction, always a Test Condition Register instruction. If there are no detected errors, the Condition Register is set to zero and the operation is initiated by the addressed I/O Unit. The program then continues to the next instruction while the I/O Unit is getting underway.

Note that the same basic sequence of events occurs for a Start I/O Instruction whose Unit Address Byte specifies a Selector Channel I/O Unit. The difference is merely that, instead of testing and loading a UCW, the Start I/O micro-program tests and loads the Selector Channel Hardware which serves the same purpose as a UCW.

Start I/O multiplex channel

Page nos. refer to pages of Appendix 1 in the above mentioned Amdahl et al. application. OP Code 1001 1100.

A detailed explanation will now be made explaining the multiplex operation in reference to FIGS. 2a, 2b, and 2c and with reference to FIGS. 3a and 3b. In this explanation reference will be made to each micro-instruction word and where it may be found in Appendix 1 so that the exact operation of the Central Procesisng Unit and related multiplex apparatus may be understood.

It should be noted that the instruction bytes selected by instruction counter IJ, 134, 135, which contains the address of the next sequential 8-bit instruction byte are referred to as IJ1, JJ2, IP3, etc., and that by referring to the byte formats above it is readily apparent which data from the instruction is then being transferred.

In the first step of the operation, XABA0, page 1401, the address in the IJ register 134, 135, FIG. 2b, is moved to the MN register 137, 138 and the J register is incremented. In the second step XACA0, the address location contained in the MN register 137, 138 is read into the R register 139, FIG. 2c, regenerated back to memory, FIG. 2b, passed through the ALU 699 to the Z bus and moved to the G register 133, FIG. 2b. The byte of information is now back in memory, in the R register 139, and in the G register 133. The control word then selects step XADA, page 1401.

In steps XADA and XAEA8, page 1401, another memory cycle is taken and the 8-bit byte from that location is stored in the L register 136, FIG. 2c, after being OR'd with the previous contents of the L register. This step is done to adjust the address (or immediate operand) under control of an "Execute Operation" which is explained particularly in the present application.

On the next two memory cycles, XFCA0 and XFDA, page 1402, the next byte is read into the R register 139, FIG. 2c, and the four high bits thereof added to the number 0000 0011, and the result placed in the T register 141, FIG. 2b. If the high four bits of the adder output are 0, the S4 latch, is turned on. If the high four bits of the adder output are $\overline{0}$, the S4 latch is turned off. This step is used to determine the next micro-step which could include in some operation the addition of the contents of the selected general purpose register to the displacement. The next control word selected is XFEA, page 1402.

In this step XFEA the four low order bits in the R register 139 (IJ3) are moved to the U register 142, FIG. 2a, and the IJ address register 134, 135 moved to the MN register 137, 138.

In steps XFFA–XFGA2, page 1403, the J register 135 is incremented and the carry latch in the ALU, 699, FIG. 2c, is turned on. In this step the IJ4 byte is transferred from the R register 139 to the V register 143, FIG. 2b. In the next step XFHD0, page 1403, the contents of the I register 134 are added to 0, the carry latch previously set is also added to the contents of the I register 134, and the results placed back in the I register with any carry-out being set into the carry controls of the ALU 699, FIG. 2c. This step increments the I register.

At this point the instruction words for this particular operation have been decoded and the results placed in the appropriate registers in the CPU as follows. The OP code is contained in the G register 133, FIG. 2b; the units address of the device to be selected is contained in the L register 136, FIG. 2c; the four high order bits of IJ3 are in the T register 141, FIG. 2b; the four low order bits of IJ3 are in the U address register 142; and the IJ4 byte is in the V address register 143 as follows:

| G | L | T | U | V |
|---|---|---|---|---|
| OP 8 | Units Add 8 | 4 | 4 | Channel Control 8 |

The UV address register 142, 143, FIG. 2b, contain the address of the Channel Control Word. The four bits stored in the T register are not used for a start I/O operation and in the micro-control step XFJF, page 1403, the high four bits of the L register 136 are added to 0000 0011 and the result forced into the T register 141.

As has been explained previously the present system has a memory called CPU bump in which is contained a plurality of general purpose registers having a total of four bytes or 32 bits. When a general purpose register is addressed, an additional set of low order bits are forced to select the particular byte which is to be read out on that memory cycle. The significance of the low order bits in relation to bit position is as follows:

| Byte Address: | Bit Position |
|---|---|
| 11 | 24–31 |
| 10 | 16–23 |
| 01 | 8–15 |
| 00 | 0–7 |

The lowest order byte address contains the most significant digits. This step which is required in the present operation also eliminates unneeded information. Based on the state of latches G4, G5, and G6, which are set in accordance with the operation code, the next micro-step is selected as QABA0, page 1403.

In this step, the number 1000 1000 will be forced into the T register. This number in decimal notation is 88. This location in the CPU bump is entitled EXTERNAL Mask. A branch is made to QACA0 based on the state of S2 (not zero), page 1409.

The V register 143, FIG. 2b, is now tested using the constant 0000 0111. In this test, the contents of the V register are logically AND'ed with the mask. This test for the presence of bits in the three lowest order positions of the V register. These bits are present for a double-word boundary. Latch S2 is turned on if the adder output is not all zero. The address in the T register 141 is now moved to the MN register 137, 138. A branch is made to QADA.

In this step, the contents of the R register 139, FIG. 2c, are crossed and are then tested using the mask 0001 0000. This tests bit position B7 in the EXTERNAL Mask for interrupt priority of external signals. The next step is QAEA.

The Address in the UV address register 142 and 143 is moved to the MN Address register 137, 138, FIG. 2b and the V register incremented. QAFC3 is the next step.

In this step the first byte of the CCW, is moved to the R register 139. This same cycle moves this Op Code contained in the R register to the D register 132, FIG. 2b, PACC1.

The address K09 is forced into the MN address register 137, 138 and the contents of the I register 134 are transferred to the R register 139, PADB. The information read from storage is disregarded and the I register contents now in storage are stored in this location. The next step is PAEB.

The address K10 is forced into the MN register and the contents of the J register 135 are moved to the R register 139. The byte in address K10 is transferred into the R register 139, FIG. 2c, but is disregarded and the contents of the J register are moved into the location K10.

In steps PAGB and PAHB, the CPU bump location K12, is cleared and the 4 high order bits of the Op Code, in addition to the low order constant 0001, are placed in bump location K12. This location is entitled SYLLABLE COUNT, PSW BIT. The 1 in bit No. 7 indicates the fact that the IJ is stored in the CPU bump, and the two high order Op Code bits indicate the length of the instruction stored.

The next memory cycle, PACC3, tests the L register 136, which contains the unit address, by using the mask constant 1000 0000. The Status Latch S4 is turned on if the high 4 order bits of the adder are all zero. This tests the Unit Address for a one in the high order position. This test, in conjunction with the next several microprogram steps PACF–PAFD1, checks both the high order and the next high order bit of the address for the presence of zeros or ones. These tests are necessary to indicate a multiplex operation with a single unit-per-control unit signified by a high order 0, or a multiplex multiple unit-per-control unit signified by a 1 in the high order and a 0 in the next high order. A 11 in the two high order bits indicates a Selector Channel unit address.

At this point the Op Code for the Channel Command Word is stored in the D register 132. The IJ register has been stored in the CPU bump, the four high bits of the Op Code have been stored in the PSW Syllable Count, and the address of the unit to be selected has been tested to determine the type of operation which is to be carried out.

At this time the address of the UCW is determined from the specified unit address.

It is assumed that the previous tests made by masking the byte in the L register have determined that the unit address is one of the first 16 UCW's in the bump memory.

Step QAFD1 controls the machine to add the low four bits of the L register 136, crossed to the high order position to 0000 0001 and place the result in the T register 141, FIG. 2b.

In steps QABF0 and QACF, one byte is read from the UCW bump addressed by the T register. The S register is cleared and the byte at that location is transferred to the R register.

In step QACF the R register is added to 0 which will allow a test to be made to determine whether the contents of same are zero. Since a "1" was added in step PAFD1 the byte being selected from the UCW is unmber 2. This byte is the Flag and Op Code byte. If the unit is not busy; that is, if it has completed its previous operation, the Flags and the Op will be 0. For a detailed explanation of the Flags and Code unit in the multiplex operation the following chart is provided, reference should be had to the general description of this feature in input/output operations.

The PA Interface register 2300, FIG. 3a is set with the constant 00001, step QADF. The PT bus has placed thereon signals in step QAEJ1 for a mask 0010 0000.

In cycle QAFF the value in the R register is incremented and the results placed in R. This cycle has a branch to 00000 to generate a loop to produce approximately a 500 nano-second delay to allow the Polling Control to come on and cause a branch to allow the CCW address in the T register 141 to be incremented and the results put back into the T register.

Step QAGF0 one byte is read from the CPU bump location K15, by moving this Address into the MN Address register. In this same step the L register is moved to the R register.

On the next succeeding step QAAF the information from memory is tested and the information in the R register is stored in location K15. The value in the T register is incremented to indicate a UCW byte number 3.

The address of the second byte of the CCW is contained in UV address register. On the step QBDB this Address is transferred to the MN Address register and the number 0000 1111 is subtracted from the low four bits of the D register. This is to test the D register which contains the Op Code which is utilized in step QBEB which will be explained subsequently.

The second byte of the CCW is read into the R register and memory is regenerated. The V register is incremented by 01000 in preparation to address the sixth byte in the CCW. Based on the test of the D register discussed previously micro instruction word QBFBO is selected. The sixth byte of the CCW is addressed by moving the address in the UV register to the MN register. The R register which contains the second byte is added to 0 and the output of the adder is tested and the S2 latch turned on if the output is not all zeros.

The next step is QBGB. The sixth byte is read from memory into the R register and the R register added to 0 to accomplish the same test as that described previously. The next step is QBHB.

The L register is moved to the R register and in step QBJB the PA Interface register 2300 is set using a constant 10001. This places the address which was in the L register 136 out across the BUS OUT lines 1601 through 1609, FIG. 3a and turns on the Polling Control 2301.

On QBKB the PA Interface register 2300 is set using the constant 11001. This again generates the address and turns on the Polling Control and in addition turns on the ADDRESS OUT line 1621.

The next succeeding step QBLB, the Address Interface register PA 2300 is set using the constant 11000, which brings up the BUS OUT lines and the ADDRESS OUT lines; and the next step selected is QBKC in which the L register is cleared and the carry latch turned off: In step SBLB the purpose was to keep the BUS OUT CONTROL 2302 and the ADDRESS OUT line 1621 on but turn off the Polling Control 2301.

In step QCBB the PT register is tested using the mask 0010 0010 where the first 0 tests for the status of the Polling Control 2301 latch and the status of the OPERATIONAL IN line 1629, FIG. 3a. If the OPERATIONAL IN line 1629 is on, S4 is reset off. If the Polling Control 2301 is on S5 is reset off.

The next step is QCCB0. The PA Interface register 2300 is now set using the constant 1101. The purpose of this is to put the I/O device address on the BUS OUT line 1601 to 1609 and turn on the ADDRESS OUT line 1621 and turn on the Polling Control 2301 again. QCCB0 was selected because in the prior control word during the masking operation found neither the S4 nor S5 latches on. This was an indication that the Polling Control 2301 was off and that the operational in line 1629 was on. In QCDH2, page 1412, the PA Register 2300 is set using the constant 0001. This turns off all the tag lines from the PA register 2300 designated SELECTION OUT.

The PT output lines were tested using the mask 1000 0000. The purpose of this mask is to determine if the tag lines contain a signal on the ADDRESS IN line 1624. If the ADDRESS IN line 1624 is off the next micro instruction QCFD0 moves the L register 136 to the L register and the carry latch is turned on. This loop occurs for up to 500 nanoseconds during which time the ADDRESS IN line should come on to cause a branch.

At this time the branch is made to QCGD0 in which step the R register is subtracted from the PI register 562 FIG. 2c with a forced carry-in. The purpose of this is to compare the I/O device address on the BUS IN lines 1611 to 1619, FIG. 3a against the address stored in the R register 139. Assuming that these two compare, the next step selected is QCHD. In this step the contents of the D registers 132 are moved to the R register 139 to place the Op or COMMAND OUT instruction to the I/O device.

The PA Interface register is set in step QCKD using the constant 10101. This is to keep the BUS OUT control 2302 and the polling control 2301 in an on condition and in addition turn on the COMMAND OUT line 1622. The next step selected is QCJB0. In this step the PT register is tested using the mask 1000 0000. This tests for an ADDRESS IN line 1624. A branch condition in the program loop is established in this microprogram step, which allows a time-out of about 500 nanoseconds to elapse during which the ADDRESS IN line 1624 should go off and cause a branch to the next program step. If ADDRESS IN line does not go off within this 500 nanosecond delay, the branch goes to an I/O stop operation.

Assume that ADDRESS IN 1624 does go off before the end of the delay time-out. When ADDRESS IN goes off, the program QCJB1 should turn off COMMAND OUT 1622. This is done by setting the PA Interface register 2300 using the constant 00000. This turns off all of the outgoing flags. The PT output is tested by QDEB1 using the mask 000000001. This test is for STATUS IN line 1625, FIG. 3a. A similar time delay loop of about 500 nanoseconds is started during which the STATUS IN line 1625 should come on. When STATUS IN comes on, the next program step QDEB0 will put zero onto the PI lines. This tests the information (Status Byte) on the BUS IN 1611–1619 for all zeros. If the I/O device Status Byte tested all zeros, the next steps will decrement the value of the V register 143, FIG. 2b and put the results in V, and read one byte from the main memory addressed by UV and again decrement the value of the V register and put in V. The next step, QDHB, tests the R register 139 using the mask 00000111. The S2 latch is turned on if adder output is not all zero. This step checks for low order zeros in the fifth byte (Flags) of the CCW, FIG. 4. If it is then determined that the I/O device is not busy (i.e., if the I/O device Status Byte and CCW Flags=0) and is ready to start an I/O operation the program QDHC–QEHB proceeds thusly. The UCW or Unit Control Word, is up-dated by moving the count byte and start address bytes into the respective positions from the CCW to the UCW, but before this operation is completed the interface operation is restarted by the following. The PA Interface register 2300 is set using the constant 00010 which turns on SERVICE OUT 1623 across the interface line. The PT output is tested using the mask 00000001. This is in conjunction with the time out as before, that is, the 500 nanosecond loop allows time for STATUS IN to go off before continuing.

Figure 4:
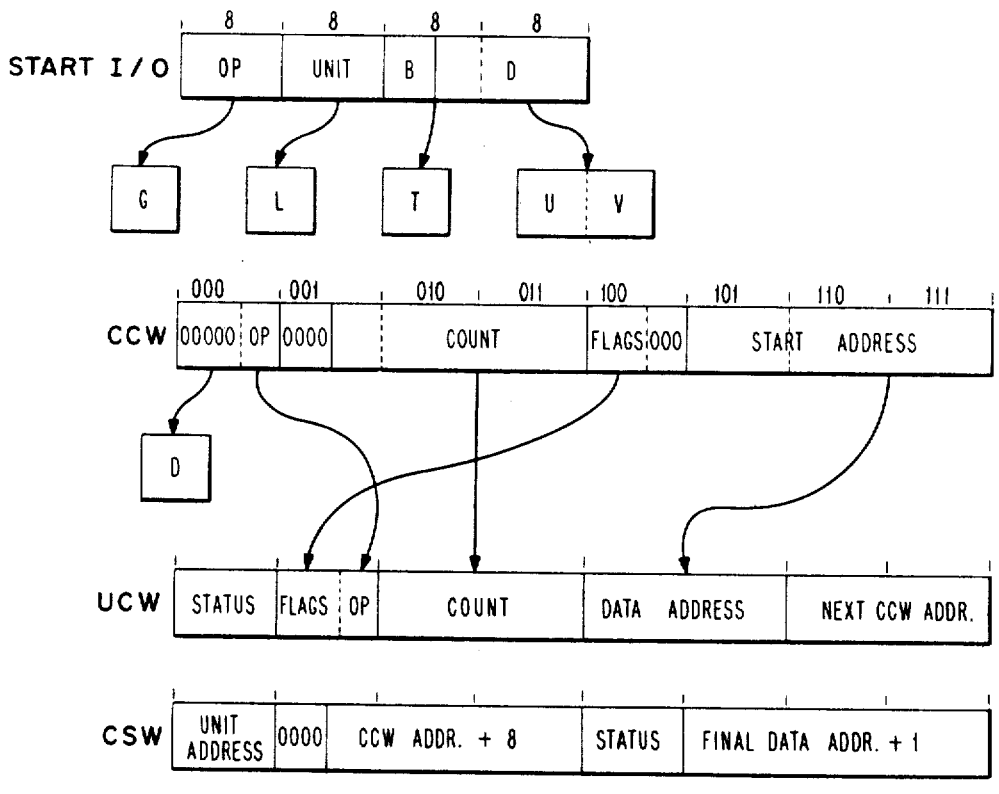
FIG. 4 illustrates a series of control word formats.

The next several micro-program steps QEKB1–QFLG0 manipulate the information from the CCW FIG. 4 to the UCW to complete the 64 bits of the Unit Control Word, including several steps to store the UV register in the UCW to form the next CCW address.

The PT output is tested with the mask 00000010. This tests the condition of the OPERATIONAL IN line 1629. When the OPERATIONAL IN line goes off, the PA Interface register 2300 is set using the constant 00000. This turns off all of the outgoing flag lines, and completes the initial selection of the I/O device.

The next several micro-program steps QFHE–AGJD restore the CPU by moving the information from the CPU bumps location K09 and K10, to the I and J registers, FIG. 2b and the OP code from K12, to the G register, FIG. 2b. The CPU is now restored to the same place in the macro-program stream from where the Start I/O program started.

*Channel Command Word*

The Channel Command Word (CCW) specifies the command to be executed, the storage area, if any, associated with the command and the action to be taken upon the completion of the command. CCW's can be located anywhere in main storage, and more than one can be associated with a Start I/O instruction. The channel refers to a CCW in the main storage only once, whereupon the pertinent information is stored in the channel. The first CCW is fetched during the execution of the Start I/O instruction. Each additional CCW in the chain is obtained when the operation has progressed to the point where the CCW is needed. The CCW format is shown in FIG. 4.

The fields in the CCW are allocated for the following purposes:

*Command Code.*—Bits 0–7 specify the operation to be performed.

*Count.*—Bits 12–32 specify the number of 8-bit byte locations in the storage area.

*Chain Data Address (CDA) Flag.*—Bit 32, when one, specifies chaining of data addresses. It causes the storage area defined by the next CCW to be used with the current operation. When this bit is zero, the current control word is the last one for the operation.

*Chain Command (CC) Flag.*—Bit 33, when one and when the CDA flag is off, specifies chaining of commands. It causes the command specified by the next CCW to be initiated upon normal completion of the current operation. When this bit is zero or when the CDA flag is on, the next CCW does not specify a new command.

Suppress incorrect length indication (SILI)

*Flag.*—Bit 34 controls whether or not the incorrect length condition is indicated to the program. When this bit is one and the CDA Flag is off in the last CCW used, the Incorrect Length indication is suppressed. If the CCW has the CC Flag on, command chaining takes place. Absence of the SILI Flag, or the presence of both the SILI and CDA Flags, causes the program to be notified of the incorrect length condition.

*Skip Flag.*—Bit 35, when one, suppresses the transfer of information to storage during a Read, Read Backward, or Sense operation. When this bit is zero, normal operation takes place.

*Program Controlled Interruption (PCI) Flag.*—Bit 36, when one, causes the channel to interrupt the program after fetching the CCW. When the bit is zero, normal operation takes place.

*Data Address.*—Bits 40–64 specify the location of an 8-bit byte in main storage. It is the first location referred to in the storage area.

Bit positions 37–39 of every CCW other than one specifying transfer in channel must contain zeros. Violation of this restriction generates the program check condition. When the first CCW specified does not contain the required zeros, the I/O operation is not initiated, and the status bit portion of the CSW is stored during the execution of the start I/O instruction. Detection of this condition during data-address chaining causes the I/O device to be signaled to terminate the operation. When the absence of these zeros is detected during command chaining, the new operation is not initiated, and an interruption condition is generated at the I/O device.

The content of bit positions 40–47 of the CCW is ignored.

Command code

The command code in the CCW specifies to the channel and the I/O device the operation to be performed.

The two low-order bits or, when these bits are 00, the four low-order bits, of the command code identify the operation to the channel. The channel distinguishes among four operations—

Output Forward (Write, Control)
Input Forward (Read, Sense)
Input Backward (Read Backward)
Branching (Transfer in Channel)

The channel ignores the high-order bits of the command code.

Commands that initiate I/O operations (Write, Read, Read Backward, Control, and Sense) cause all 8 bits of the command code to be transmitted to the I/O device. In these command codes the high-order bit positions contain modifier bits. The modifier bits specify to the I/O device the details of how the command is to be executed. They may cause the I/O device to perform comparison on the data received during a Write operation and cover such conditions as recording density and parity. For the Control command the modifier bits specify the control function to be performed. The exact meaning of the modifier bits depends upon the type of I/O device and is specified in the functional description of the device.

The command codes have the following assignment—

| * | * | * | * | 0 | 0 | 0 | 0 | Invalid Code |
|---|---|---|---|---|---|---|---|---|
| M | M | M | M | 0 | 1 | 0 | 0 | Sense |
| * | * | * | * | 1 | 0 | 0 | 0 | Transfer in Channel |
| M | M | M | M | 1 | 1 | 0 | 0 | Read Backward |
| M | M | M | M | M | M | 0 | 1 | Write |
| M | M | M | M | M | M | 1 | 0 | Read |
| M | M | M | M | M | M | 1 | 1 | Control |

Legend: *Bit position ignored. M = Modifier Bit.

Whenever the channel detects the invalid code during the initiation of a command, the program check condition is generated. When the first CCW specified contains an invalid command code, the status-bit portion of the CSW is stored during the execution of the start I/O instruction. When the invalid code is detected during command chaining, the new operation is not initiated and an interruption condition is generated. The command code is ignored during data-address chaining.

Definition of storage area

The main-storage area associated with an I/O operation is defined by CCW's. A CCW defines an area by specifying the address of the first 8-bit byte transmitted and the number of 8-bit bytes that the area contains. The address of the first byte appears in the data-address field of the CCW. The number of bytes contained in the storage area is specified in the count field.

In Write, Read, Control, and Sense operations storage locations are used in ascending order of addresses. As information is transferred to or from main storage, the content of the address field is incremented and the content of the count field is decremented. The Read Backward operation causes data to be placed in storage in a descending order of addresses, and both the count and address are stepped down. When in any operation the count reaches zero, the storage area defined by the CCW has been exhausted.

Any storage location provided in the system can be used to transfer data to or from an I/O device, provided that during an input operation the location is not protected. Similarly, the CCW's can be specified in any part of the available main storage. When the channel attempts to store data at a protected location, the protection check condition is generated, and the device is signaled to terminate the operation.

When the channel refers to a location not provided in the system, the program check condition is generated. When this condition occurs because the first CCW specified contains a data address that is too big for the particular type of system, the I/O operation is not initiated and the status-bit portion of the CSW is stored during the execution of the Start I/O instruction. Attempts to transmit data to or from a nonexistent storage location and detection of an invalid CCW address during data-address chaining are indicated to the program with the interruption condition at the end of the operation. In either case the I/O device is signaled to terminate the operation upon detection of the conditions. When an invalid address is detected during command chaining, the new operation is not initiated and an interruption condition is generated.

Chaining

When the channel has performed the transfer of information specified by a CCW, it can continue the activity initiated by the Start I/O instruction by fetching a new CCW. The fetching of a new CCW upon the exhaustion of the preceding one is referred to as chaining, and the CCW's belonging to such a sequence are said to be chained.

Chaining normally takes place only between CCW's located in successive double-word locations in storage. It proceeds in an ascending order of addresses; i.e., the address of the new CCW is obtained by adding 8 to the address of the preceding CCW. Two chains of CCW's located in noncontiguous storage areas can be coupled for the purpose of chaining by means of the TRANSFER IN CHANNEL command. All CCW's in a chain apply to the I/O device specified in the original Start I/O instruction.

There are two types of chaining—chaining of data addresses and chaining of commands. It is controlled by the Chain Data Address (CDA) and Chain Command (CC) flags in the CCW. These flags specify the action that is to be taken by the channel upon the exhaustion of the current CCW. The following code is used—

| CDA | CC | Action |
| --- | --- | --- |
| 0 | 0 | No chaining. The current CCW is the last one. The operation is terminated. If data at the I/O device are divided into blocks, the beginning of the next block is set up at the device. |
| 0 | 1 | Command Chaining. |
| 1 | 0 | Data-Address Chaining. |
| 1 | 1 | Data-Address Chaining. |

The setting of the CDA and CC flags is effectively propagated through the TRANSFER IN CHANNEL command. When in the process of chaining a TRANSFER IN CHANNEL command is fetched, the following CCW is used for the type of chaining specified in the CCW preceding the TRANSFER IN CHANNEL command.

The CDA and CC flags are defined for CCW's associated with all commands except TRANSFER IN CHANNEL.

Data-Address chaining

During Data-Address chaining the new CCW fetched by the channel defines a new storage area for the original operation. The execution of the command at the I/O device is not affected. The channel continues the operation using the storage area defined by the new CCW. The content of the command code field of the new CCW is ignored, unless it specifies transfer in channel.

Data-address chaining permits information to be rearranged as it is transferred between main storage and an I/O device. It also permits a block of information to be transferred to or from noncontiguous areas of storage, and is necessary for the skipping feature.

*Programming note.*—When during a Read, Read Backward or Sense operation the program specifies data-address chaining to a location into which data has been placed under the control of the preceding CCW, the channel fetches the new contents of the location. This applies to any portion of data transferred under the control of the preceding CCW, including the last byte. The program, therefore, can use self-describing records; i.e., it can chain to a CCW that has been read under the control of the preceding CCW. However, since the program is not notified of any data errors until the end of the operation, there is no assurance that the CCW is correct. The channel and I/O devices force correct parity on data during an input operation, and a CCW may be invalid even though its parity is good.

Command chaining

During command chaining, the new CCW fetched by the channel specifies a new I/O operation. When the I/O device sends the Unit Freed signal indicating the completion of the current operation, the channel initiates the operation specified by the new CCW. The normal termination of the preceding I/O operation does not generate interruption conditions. For operations involving data transmission the new command always applies to the next block.

Command chaining takes place and the new operation is initiated only if no unusual conditions have been detected in the preceding operation. If a condition such as Data Check, Incorrect Length or Exceptional Condition has occurred, the sequence of operations is terminated and a condition for I/O interruption is generated. The new CCW in this case is not fetched. The Incorrect Length Condition does not suppress command chaining if the CCW has both the CC and the SILI flags on.

An exception to sequential chaining of CCW's occurs when the I/O device presents the Jump condition with the Unit Freed signal. The combination of Jump and Unit Freed bits, in the presence of the CC flag, causes the channel to fetch and chain to the CCW whose main-storage address is sixteen higher than that of the preceding CCW.

Command chaining makes it possible for the program to initiate the transmission of multiple blocks of data via a single start I/O instruction. It also permits a single instruction to specify certain auxiliary functions such as rewinding tape at the time data transmission is initiated. Command chaining in conjunction with the Jump condition permits the channel to modify the normal sequence of operations in response to signals provided by the I/O device.

Multiplex Share Routine

The purpose of the Multiplex Share Routine is to allow the CPU to continue on a problem program until such time the I/O device (previously selected) has information to send to the computer or is in a status to receive information from the computer. In this case the I/O device will notify the channel in the computer that it is ready to receive or transmit data. This is done in the I/O device by setting its control Request Latch. When the computer polls the output devices by sending a SELECT OUT across the control lines, the I/O device which is ready interrupts by sending back to the computer OPERATIONAL IN followed shortly thereafter by ADDRESS IN. The computer, after storing the registers that were being used in the problem program, responds to ADDRESS IN by a COMMAND OUT. The normal response to a COMMAND OUT from the I/O device through the channel is SERVICE IN. The response to SERVICE IN by the computer is SERVICE OUT. This is normally followed by the device turning off OPERATIONAL IN which signifies the end of one byte in the Interleave mode or Share mode.

A multiplicity of microprogram cycles are required to condition the CPU to take control of the channel and operate as an I/O control device. The first micro-program step entitled RABB addresses the CPU bump location K00. The information in the R register is stored in the CPU bump location K00. The bump location K01 is addressed and the information in the T register is moved to the R resgister and then to location K01.

Within the CPU bump there are registers assigned for the storage of the various CPU registers. These are addressed by CPU bump location 908, 909, 910, 911, 912, 913, 914, and 915. These are the I, J, S, V, U, G, B, and L registers respectively. A stream of micro-programs from RAGB through RACH0 successively address and store the registers in the CPU BUMP in reverse order (i.e., L register goes to the L storage in CPU, D to the D, U to the U, V to the V, and S goes to the S CPU location 910). Locations 908 and 909 (the I and J registers) are not used in this particular operation.

Micro-program step RAHD effectively reads the BUS IN 1611–1619, FIG. 3a, to the S register. This places the address of the I/O device (which was on BUS IN) into the S register. The S register is then stored in the L register. The low four bits of the S register are then crossed to the high order bits of the T register 141. This adjusts the address in the T register which will eventually address the Unit Control Word by putting the four low order address bits of the I/O device concerned into the high order T register 141. This selects the general Unit Control Word associated with the specific I/O device.

The next micro-program step sets the Multiplex Latch 2303, FIG. 3b, in the channel which in turn starts the Polling Control 2301 (the SELECT OUT line 1627) to the I/O device. The Unit Control Word is addressed from the T register 141 which in the high order positions has the address of the I/O device and the low order positions are restored to 0. This addresses the first byte or the Status Byte of the Unit Control Word. The T register is then incremented in preparation to address the second byte of the Unit Control Word. The first byte of the Unit Control Word is moved to the S register 140. The second byte of the Unit Control Word which contains the Operation and the Flags is then moved to the G register 133. The second byte of the Unit Control Word is tested under the Mask 00001000. This tests the PCI flag bit; that is, the Program Control Interrupt Flag.

The PT output is tested under the Mask 00001000. This tests the channel for the Suppress Interrupt 1630 condition. Assuming neither the Suppress Interrupt nor the PCI Interrupt conditions are on, the normal Share operation is continued.

The PA Interface register 2300 is set using the constant 00101. This turns on the COMMAND OUT 1622 and the Polling Control 2301 latches which turns on SELECT OUT 1627 and COMMAND OUT 1622 across the interface to the I/O device.

The next cycle tests the PT output using the Mask 10000000. This tests the CHANNEL IN lines for ADDRESS IN 1624 from the I/O device. The D register 132 is looped back on the D register adding one each time to perform the 500 micro-second delay which allows ADDRESS IN 1624 ample time to turn off under normal conditions. If ADDRESS IN 1624 fails to go off within this prescribed time delay, the machine branches to a Stop condition. Assuming that ADDRESS IN 1624 does go off within the time delay, the micro-program branches to the next step which sets the PA Interface register 2300 using the constant 00001. This turns off the COMMAND OUT latch 1622 but keeps the Polling Control 2301 on. This is in keeping with the interface specification that ADDRESS IN going off will turn of COMMAND OUT. The third byte from the UCW is then into the R register 139 and tested for all zeros. The third byte of the UCW is the high order count. Assuming all zeros are high order, the fourth byte from the UCW which is a low order count is then read out and tested for all zeros. This count indicates to the CPU exactly how many more bytes of information are to be transmitted across the interface. Assuming this count 0, the next micro-program cycle will test the PT output using the mask 00010001. This checks a channel interface for SERVICE IN 1626 and STATUS IN 1625. The presence of an ON condition for both SERVICE IN and STATUS IN indicates an error. The presence of SERVICE IN 1626 indicates a normal intermediate step for the interchange of information. The presence of STATUS IN 1625 alone indicates an End procedure from the I/O device; that is, this is the last step.

It is assumed that SERVICE IN 1626 is on from the I/O device. In this explanation it is assumed that a Read condition has been established for the multiplex channel; that is, information will be accepted from the I/O device and placed in the location in the computer main memory designated by the Data address.

The next micro-program step decodes the particular OP code or command from the G register 133. An 8-way branch on G5, G6, G7, and a forced 0 is taken. Following a branch due to the particular decode on the command, the next program step addresses and reads out the fifth byte from the UCW and puts this byte (which is a high order of the data address) into the R register 139 where it is tested for zeros. Following the test of 0, the high order data address is placed into the V register 143. The next micro-program step then reads the sizth byte from the Unit Control Word, places it in the R register 139 and tests for zeros. This sixth byte is the low order of the data address. The data address from the UCW indicates the location within main memory wherein the information byte from the I/O device will be placed. The next micro-program cycle places the sixth byte, or low order data address into the U register 142. The V and U registers now have the full data address or location within main memory for the I/O device data.

The next micro-program step sets the PB Interface register 2304 using the constant 01001. This will turn on the I/O Data Latch 2305 in the channel.

The next micro-program step, RCJD1, will address main memory from register UV and put the information from the PI lines into the R register 139. This in effect reads the BUS IN 1611–1619 from the I/O device and places it in the R register which then is stored in main memory at the address specified by the Data Address from the UCW. The next micro-program cycle sets the PA Interface register 2300 using the constant 00011. This turns on the SERVICE OUT 1623 and Polling Control 2301 latches. This in effect turns on SERVICE OUT 1623 and SELECT OUT 1627 on their respective lines to the I/O device.

The next micro-program step turns off the I/O Data Latch 2305. The following micro-program step, RDDC0 tests the PT output using a mask 0001 0000. This tests for SERVICE IN 1626. In normal operation, SERVICE IN 1626 should go off upon the receipt of SERVICE OUT 1623 from the CPU. As before a micro-program step is inserted to permit a 500 nano-second loop during which SERVICE IN 1626 should go off. If SERVICE IN fails to go off within this allotted time, the next micro-program step will branch to STOP. Assuming that SERVICE IN 1626 does go off within the allotted time, the next program step tests the PT output using the Mask 00000010. This will test the I/O device interface line for OPERATIONAL IN. OPERATIONAL IN 1629 should have gone off with SERVICE IN 1626. Assuming OPERATIONAL IN to have gone off with SERVICE IN, the next micro-program step will set the PA Interface register 2300 using the constant 00000. This turns off all flags; that is, it resets SERVICE OUT 1623 and SELECT OUT 1627. This completes all of the interchange of controls and information for one Interleave mode, Byte, or Share routine.

The next micro-program step restores the UCW or Unit Control Word address to address the first byte. This byte (which is the Status byte) is read out to the R register 139 and bits 5, 6, and 7 are cleared and the complete byte put into the D register 132. The next microprogram step then logically OR's the contents of the S register 140 with the D register 132 and puts the result into the R register 139. This takes the information which was in the S register (and which was the I/O device address), places it in the allotted bit positions within this UCW Status Byte, and puts the result into the R register. The R register 139 is now stored back into the UCW as a Status Byte; that is, the UCW stored following this share operation contains the address of the I/O device in its status byte.

The next micro-program step tests the PT register using the mask 0100 0000. This will test the channel for a Share Request 2306. If no such request exists, the next operation will set the PB Interface register 2304 using the constant 01010. This operation turns off the Multiplex Latch 2303. Assuming as before that an additional Share Request does not exist, that is, that the I/O device did turn off OPERATIONAL IN 1629 and being a Read operation, the computer will not address the I/O device for a second byte. In this case, the next step, REDC1, will start the restore CPU procedure. The T register 141 is set to 1001 1010, which is a 910 address in the CPU bump. This address is read out of the CPU bump, and the information which was stored there from the S register 140, prior to going into the Share routine, is read back out and into the S register 140 in the CPU. In like manner, the information in the CPUV register is read out to the V register 143, the U to the U register, and the G to the G register, the D to the D register, and the L to the L register. Next, the CPUK addressable bump location K01 is read out and the contents placed into the T register 141. The CPUK addressable location K00 is then read out and the contents placed in the R register 139. The CPU is now completely restored; all the operating registers have the information that was stored prior to going into the Share Request. The computer now returns to the main program stream. This completes the one-byte Share rountine.

*Selector channel operation*

Start I/O.—The explanation of the Selector Channel that follows presupposes a knowledge of the Multiplex Channel operation.

The first 27 microprogram words for Selector Channel selection of the I/O device are the same or in the case of the last few steps, similar, to the Multiplex Initial Selection operation.

The first microprogram word XABA0 addresses the main memory through the MN register from the IJ register. The following microprogram word puts the information from main memory into the G register. This is the Op Code.

Microprogram word XAEA8 stores the second byte in the Start I/O in the L register. The next two memory cycles or microprogram words, XFCA0 and XFDA add the next byte in the Start I/O to 0000 0011 and place the results in the T register. Microprogram word XFEA places four low bits of the third byte into the U register. This procedure continues the same as the Multiplex operation until the Op Code is in the G register, the Unit Address in the L register, and the CCW address in the U and V registers. Several cycles later, microprogram QABA0 will add 0 to the constant 1000 1000 with a forced carry-in, place the results in T. This puts an effective CPU bumps address 88, FIG. 39, into the T register 141, FIG. 2c. The B register is now tested for the presence of 1 bits in the low three order bits of the register. These should all be 0 indicating a valid double word boundary. The information in the CPU bump address 88 is now moved to the R register, 139, FIG. 3c on the next memory cycle QABA.

This information is now tested for Interrupt Priority of external signals. Main memory is now addressed by UV registers 142 and 143, and the next memory cycle QAFC3 moves the first byte or Op Code of the CCW to the R register 139 and into the D register 132.

CPU bump locations K09 and K10 are now used to store the I and J registers 194 and 135, respectively, into K09 and K10. CPU bump location K12 is cleared and te four high order bits of the Op Code and a low order constant 0001 are placed in bump location K12. This location is entitled Syllable Count PSW Bit. The 1 in bit 7 of the Syllable Count byte indicates the fact that the IJ register 194 and 135 are stored in CPU bump. The two high order Op Code bits indicate the length of the instruction stored. Several cycles later, micro-program word PACC3 tests the L register 136 which contains a Unit Address by using mask constant 1000 0000. Several more micro-program words PACF through PAFD1 check the high and the next high order bit of the address for the presence of zeros and ones. These tests indicate whether a Multiplex operation or a Selector operation is called for by the instruction. From this point on, the operations will differ; i.e., a Selector Channel operation will now go off on a separate routine from that which the Multiplex Channel operation would have done.

Ones in the two high order bits of the L register or Unit Address indicates that a Selector Channel unit address is called for. In the following detailed description of the Selector Channel operation, reference will be made to FIGS. 5a, 5b and to the print-out sheets of the microprogram words associated with Selector Channel operation. The first micro-program word ZFBB will place the constant 01000 into the HB register. This is done as follows: The line HB=K568, enters the block HB2287 and allows the K Bus 2274 to place the constant into the register. This will initiate the Time-Out Single Shot which will continue its output for approximately one millisecond. This single shot is located in Channel Controls 2275.

The next microprogram word ZFGF1 will test the HT register 2284 using a mask 0000 1000. This will test the Selector Channel for Channel or Unit Busy. The next micro-program word ZFDA1 will place the constant 00001 into HA2286. This is accomplished by line HA=K567, entering block HA2286, which allows the K bus 2274 to place the constant into the HA register. This will cause the Selector Channel to initiate the select out line 1627 to the I/O device. The next microprogram word ZFEC1 will test the HT register 2284 using a mask 0001 0000. To accomplish this the line A=HT566 will come up and gate the HT register onto the A bus. This will test the Selector Channel Polling Control.

The next microprogram word ZFFF will test the HS register 2285 using the mask 0000 0100. This will test for the presence of an output from the Time-Out Single Shot.

The next microprogram word ZFGF0 will cause one byte from the CPU bump addressed by location K04.

K04 is the Select Channel Unit Address byte. Microprogram word ZFHF places the information or data from the R register which contained the unit address into bump location K04. This step also will set the HB register 2287 with the constant 10000. This will turn on the chaining interlock latch.

Microprogram word ZFJC0 and ZFKC will move the contents of the U register 142, FIG. 2b, into bump location K05 on FIG. 39. ZFKC will also clear the three low order bits of the V register, 143, FIG. 2b. The next two microprogram words ZFLC0 and ZFKC move the contents of the V register 143, FIG. 2b, to bump location K06. The last several microprogram words have then placed the unit address in K04 and the CCW address in K05 and K06.

Figure 5A:
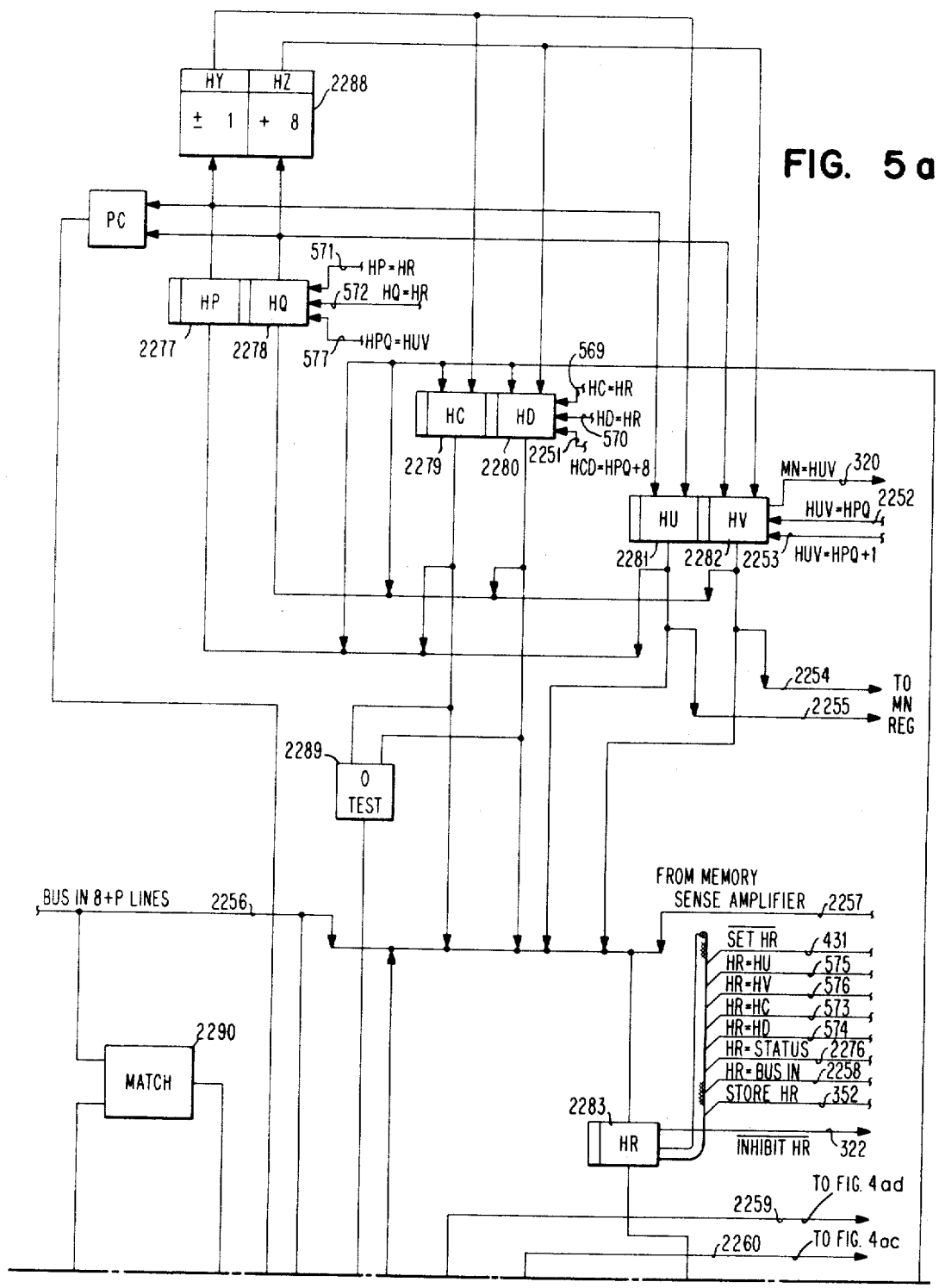
FIGS. 5a and 5b are a detailed circuit for a selector channel used in the central processing unit.
Figure 5B:
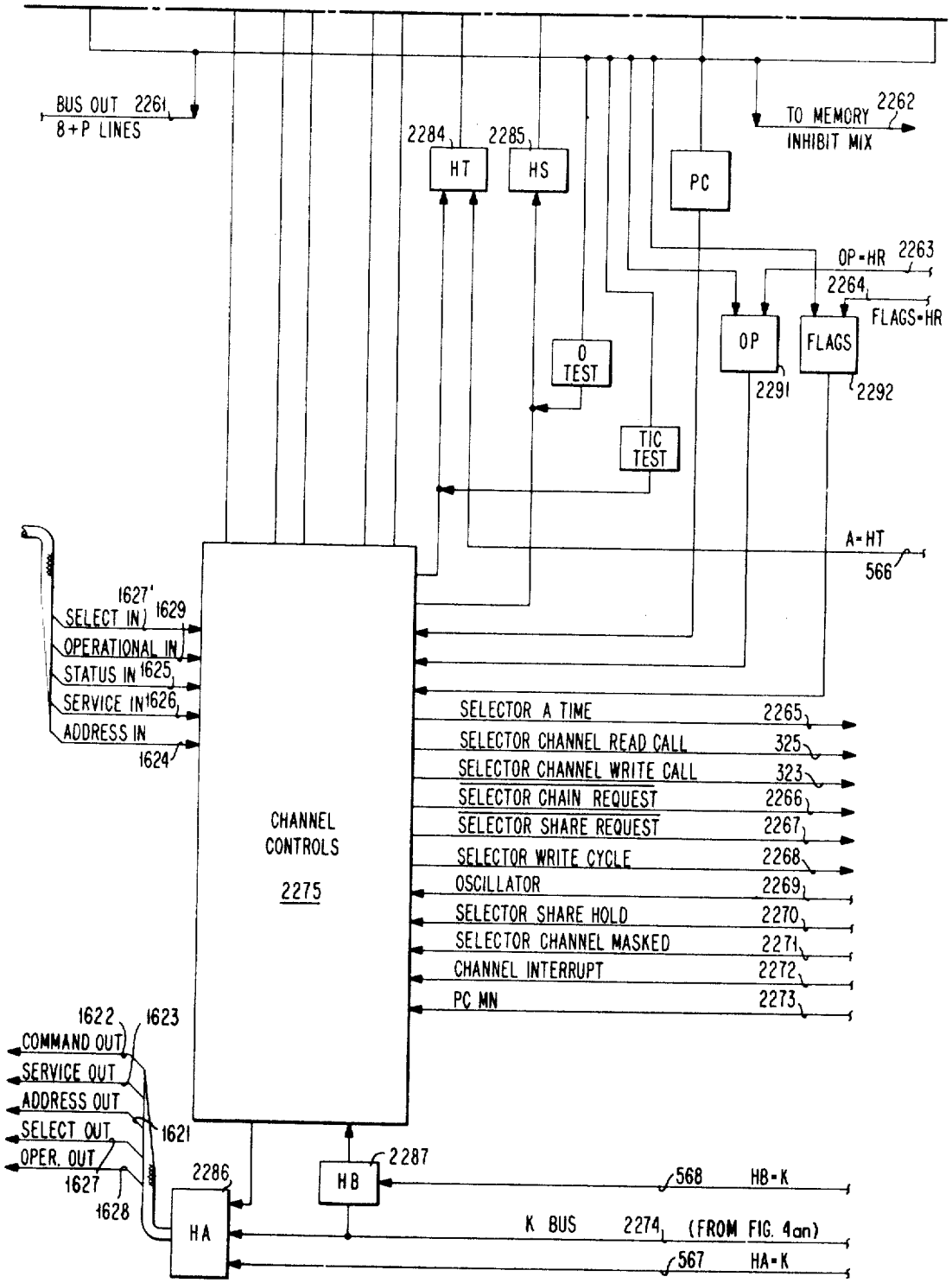

Microprogram words ZFLC2 and ZFBH move the contents of bump location K05 (which contains the data of the U register 142) into the HR register 2283 of FIG. 5a, and then to the HP register 2277 on FIG. 5a.

Microprogram ZFCH and ZFDH will move the contents of the bump location K06 (which contains the data of the V register 143), into the HR register 2283 and then to the HQ register 2278, FIG. 5a. In addition, this last microprogram word will load the HCD registers 2279 and 2280 with the contents of the HPQ register 2277 and 2278, FIG. 5a, by passing the data through the HZ (plus 8 block) 2288 which effectively increments the data by eight.

The last two microprogram words then moved the contents of K06 to the HQ register and then incremented the same information by 8 and placed it into the HCD registers. The information in the HCD register 2279 and 2280 is the next CCW address, inasmuch as the previous CCW address was incremented by 8.

The next two microprogram steps ZFEH and ZFFH will place the contents of the HC register 2279 into K05 bump. These steps also will cause the HUV registers 2281 and 2282 to be loaded from the HPQ registers 2277 and 2278. This places the address of the first byte of the current CCW into HUV. These steps also set the HB register 2287 with constant 01000. This will initiate the Time-Out Single Shot.

The next micro-program word ZFGH in addition to ZFHH will place the contents of the HD register 2280 into bump location K06. The last four microprogram words then placed the next CCW address into Bump locations K05 and K06. This information came from registers HCD 2279 and 2280, FIG. 5a. Microprogram words ZFJH and ZFKH will address main memory on FIG. 2c from register HUV 2281 and 2282. Following the addressing of main memory, the HUV register will be incremented by adding the contents of the HPQ registers 2277 and 2278 by passing this information through HY 2288 to increment by one. This will increase the address of the CCW by one and will cause the second byte of the CCW to be addressed. The information from main memory on FIG. 2c, that was addressed by HUV 2281 and 2282 (or the first byte of the CCW), is read into the HR register 2283, then gated to the HC register 2279; and the last three bits of this byte are gated to the Op register 2291. This places the first byte of the CCW (flags and Op) into HC and the Op portion of this byte into the Op register 2291. The next micro-program word ZGBC will test the HS register 2285 with a mask 0000 0010. This tests the three low-order bits of the HR register for non-zero. (This tests the validity of the Op Code contained in the HR register).

The next microprogram word ZGCC addresses main memory FIG. 2c from the HUV register 2281 and 2282. This places the address of the second byte of the CCW into the MN registers, FIG. 2b, to address main memory 4ac. This word also tests the HT register 2384 by using the mask 0000 0001. This will test the channel for a TRANSFER IN Channel condition. The next microprogram word ZGDC0 will place the second byte of the CCW into the HR register 2283. It will also cause the information in the HR register to be regenerated into main memory 2c through inhibit HR line 322. This word also will test the HS register 2285 using the mask 0010 0000. This will test the HR register for a non-zero condition (this tests for significant data from main memory addressed by HUV).

The next two micro-program words ZGED1 and ZGFB1 will cause the I/O device address stored in bump location K04 to be read into the HR register 2283, on FIG. 5a, in preparation for being gated across the BUS OUT lines 2261. This is accomplished in the same steps by setting the HA register 2286 with the constant 10001, which will cause both BUS OUT 2261 to be gated with the address from K04 and will cause the SELECT OUT line 1627 to be turned on. The following microprogram words ZGGC will set the HA register 2286 with a constant 11001. This, as before, causes BUS OUT and SELECT OUT to turn on but in addition causes ADDRESS OUT 1621 to be turned on. This is in keeping with the interface specification that the address must be on the BUS OUT lines 2261 before the ADDRESS OUT Flag line 1621 is turned on. The next microprogram words ZGEJ1 tests the HT register 2284 using the mask 1000 0000. This will test for the presence of the OPERATIONAL IN line 1629 from the I/O device. The next microprogram word ZGBJ will test the HT register 2284 using the mask 0000 0100. This will test the selector channel for the condition No Response. The next two microprogram words ZGCK1 and ZGDH0 both test the HS register 2285 using the masks 0000 0100 and 0000 1000 respectively. The first test will check for the presence of an output from the Time-Out Single Shot which was initiated by microprogram word ZFFH. This single shot has a time constant of approximately one millisecond. The second test will check the condition of the chain Interlock Latch.

The next three microprogram words ZGEH, ZGGH1 and ZGHJ0 will read out bump location K11, which is the Condition Register and Mask, will insert the constant 0001 into the four high order bits of this mask and return the byte to K11. In addition, the last microprogram word mentioned will set the HA register 2286 with a constant 00000. This resets all the TAG OUT lines (turns off all commands to the I/O device). The next microprogram word ZHFD0 tests the HT register 2284 using the mask 1010 0000. This will test the incoming Tag lines on the I/O device for OPERATIONAL IN status 1629 and for IN STATUS IN 1625. The next microprogram word ZHGG1 will test the HS register 2285 using the mask 0000 0100. This tests for the presence of the Time-Out Single Shot as in ZGCK1.

Assuming the test for OPERATIONAL IN and STATUS IN lines prove to be zero, a branch to microprogram word ZHFD1 will be caused. This microprogram word then branches to AGBA1 which will clear the L register and cause branch to XABA0. This will signify that a successful initial selection of an I/O device on the selector channel has been accomplished. The summary of the use of the registers on FIGS. 5a, b follows: The CCW address placed into HPQ2277 and 2278, is then passed through HZ2288 to be incremented by eight and placed in HCD2279 and 2280. This latter register then contains the address of the next CCW. The contents of HPQ2277 and 2278 are then directly gated into HUV2281 and 2282. HUV is then used to address the current CCW in main memory and following each address cycle, HUV is gated to HPQ and HPQ is incremented by one through HY2288 and placed into HUV2281 and 2282. In this manner the bytes of the CCW required will be addressed from main memory and operated upon through the HR register 2283. The condition or status of the I/O device and the Selector Channel controls will be tested by reading out either the HT register 2284 or the HS register 2285 using the particular mask required to perform the test. These tests result in branching when Z is zero or Z is one.

Channel Status Word

The Channel Status Word (CSW) provides to the program the status of an I/O device or the conditions under which an I/O operation has been terminated. It is formed, or parts of it are replaced, in the process of I/O interruptions, and by the start I/O and test I/O instructions. The CSW is placed in main storage at location 64 and is available to the program at this location until the time the next I/O interruption occurs or until a start I/O or test I/O instruction causes its content to be replaced, whichever occurs first.

When the CSW is stored as a result of an I/O interruption, the associated I/O device is identified by the I/O address in the old PSW. The information placed in the CSW by the start I/O or test I/O instruction always pertains to the I/O device to which the instruction was addressed.

The CSW has the format shown in FIG. 4.

The fields in the CSW are allocated for the following purposes:

*Protection Tag.*—Bit positions 0–3 contain the storage protection tag that was used in the chain of operations initiated by the last start I/O instruction.

*Command Address.*—Bits 8–31 identify the last CCW used.

*Status Bits.*—Bits 32–47 identify the conditions in the I/O device and the channel that caused the storing of the CSW. Bits 32–39 are obtained over the I/O interface and indicate conditions detected by the I/O device or the control unit. Bits 40–47 are provided by the channel and indicate conditions associated with the channel. Each of the sixteen bits represents one type of condition. The conditions marked with an "I" cause I/O interruptions to occur and are referred to as interruption conditions. The bit assignment is as follows:

| | | |
|---|---|---|
| Bit 32 | I | Attention. |
| Bit 33 | | Jump. |
| Bit 34 | | Unit Data Check. |
| Bit 35 | | Busy. |
| Bit 36 | I | End. |
| Bit 37 | I | Unit Freed. |
| Bit 38 | I | Intervention Required. |
| Bit 39 | I | Exceptional Condition. |
| Bit 40 | I | Program Controlled Interruption. |
| Bit 41 | | Incorrect Length. |
| Bit 42 | | Program Check. |
| Bit 43 | | Protection Check. |
| Bit 44 | | Channel Data Check. |
| Bit 45 | I | Channel Control Check. |
| Bit 46 | I | Interface Control Check. |
| Bit 47 | | Chaining Check. |

*Count.*—Bit positions 48–63 contain the residual count of the last CCW used.

Channel Status Word Content

The content of the CSW depends upon the condition that caused its storing and upon the method by which the status information was obtained. When the CSW is stored during the execution or upon the termination of an I/O operation at the subchannel, the contents of the tag, command address and count fields normally are related to the current values of the corresponding quantities. The CSW at this time can be stored only by an I/O interruption or by the test I/O instruction. A CSW associated with conditions that occur after the operation at the subchannel has been terminated contains zero in the tag, command address and count fields, provided that the conditions are not cleared by the start I/O instruction. These conditions include the Attention and Unit Freed conditions, and the end condition when it occurs after the termination of an operation on the selector channel by halt I/O.

When the above conditions are cleared by the start I/O instruction, only the status-bit portion of the CSW is stored, and the original contents of the tag, command address and count fields in location 64 are preserved. Similarly, only the status bits of the CSW are changed when the command is rejected or the operation at the subchannel is terminated during the execution of the start I/O instruction.

Errors detected during the execution of the I/O operation do not affect the validity of the CSW, unless the channel control check or interface control check conditions are indicated. The channel control check indicates that equipment errors have been detected which can cause any part of the CSW to be invalid. The interface control check indicates that the address identifying the I/O device or the status bits received from the device may be invalid. The channel forces correct parity on CSW fields which it detects to be invalid.

PROTECTION TAG.—A CSW that is stored to reflect the progress of an operation at the subchannel contains the protection tag used in that operation. The content of this field is not affected by programming errors detected by the channel or by the conditions that caused the termination of the operation.

RBKB1:
    Set the PA Interface register using the constant 00001.
    Turn off S4 and S5.
    Branch to RBBE0 on S6 and S7.
    (Same as Multiplex Share Routine to this point.)

RBBE1:
    Test the PT register using the mask 0001 0001.
    Turn S4 on if high four bits of adder output is all zero.
    Turn S4 off otherwise. Turn S5 on if low four bits of adder output is all zero. Turn S5 off otherwise.
    Branch to RFBB.
    This tests for SERVICE IN and/or STATUS IN.

RFBB:
    Clear the D register and turn off the carry latch.
    Branch to RFCB0 on S4 and S5.
    (To RFCB1 on Service In).

RFCB1:
    Test the G register using the mask 1000 0000.
    Branch to RFDD.
    This tests for the CDA (Chain Data Address) flag.

RFDD:
    Test the G register using the mask 0010 0000.
    Branch to RFED0 on 0 and Z is 0.
    (Indicates presence of CDA).

RFED0:
    OR the T register with 0000 0110 and place the result in T.
    Branch to AGBD.
    Puts address of UCW 7th byte in T (Lo-Order of Next CCW).

RGBD:
    Read one byte from UCW bump addressed by T.
    Increment the value of the T register and put the result in T.
    Turn off S7.
    Branch to RGCD.
    Reads out UCW 7th.

RGCD:
    Put information from memory into R and delay memory write for one cycle.
    Add the R register to 0000 1000 and place the result in R and the carry out into the carry latch.
    Branch to RGDD.
    This adds 8 to Lo-Order "Next CCW Address" which produces new "Next CCW Address."

RGDD:
    Put information from memory into R and regenerate memory.
    Decrement the value of the R register by 1000 and put the result in V.
    Branch to RGED.
    Puts new "Next CCW Address" into UCW.
    Restores original "Next CCW Address" into V register.

RGED:
    Read one byte from UCW bump addressed by T.
    Decrement the value of the T register and put the result in T.
    Branch to RGFD.

Same as previous operation except it is done to Hi-Order Next CCW Address.

RGFD:
  Add the R register to zero with a carry-in from the carry latch and place the result in R and the carry out into the carry latch.
  Branch to RGGE0 on 0 and S3.
  Adjusts Hi-Order by one if carry was present from Lo-Order.

RGGE0:
  Put information from memory into R and regenerate memory.
  Move the R register to the U register.
  Branch to RGHD.
  Stores new "Next CCW Address" in UCW.
  Puts original "Next CCW Address" into U register.

RGHD:
  Read one byte from main memory addressed by UV.
  Increment the value of the V register and put the result in V.
  Branch to RGJD.
  (CCW 1st byte).

RGJD:
  Put information from memory into R and regenerate memory.
  Exclusive OR the low four bits of the R register crossed to the high order position with 1111 0000.
  Branch to RGBF.
  Tests CCW 1st byte for zero in low-order bits.

RGBF:
  Read one byte from main memory addressed by UV.
  Increment of the value of the V register by 0010 and put the result in V.
  Branch to RGCJ0 on S4 and S7.
  (CCW 2nd byte).

RGCJ0:
  Put information from memory into R and regenerate memory.
  Add the R register to zero.
  Branch to RHBB.
  Tests 2nd byte for zeros.

RHBB:
  Read one byte from the main memory addressed by UV.
  Decrement the value of the V register and put the result in V.
  Turn S2 off.
  Branch to RHCC0 on S6 and Z is 0.
  (CCW 4th byte).

RHCC1:
  Put information from memory into R and regenerate memory.
  AND the T register with the complement of 0000 0101 and place the result in T.
  Branch to RHDD.

RHDD:
  Read one byte from UCW bump addressed by T.
  Increment the value of the T register and put the result in T.
  Branch to RHED.
  (UCW 3rd byte).

RHED:
  Disregard information from memory and store information from R in the memory location.
  Add the R register to zero.
  Turn S2 on if adder output is not all zero.
  Branch to RHFD.
  Test UCW 3rd byte for zeros then clear 3rd byte to zero.

RHFD:
  Read one byte from main memory addressed by UV.
  Increment the value of the V register by 0011 and put the result in V.
  Branch to RHDG0 on S6 and 1.
  (CCW 3rd byte).

RHGD0:
  Put information from memory into R and regenerate memory.
  Add the R register to zero.
  Turn S2 on if adder output is not all zero.
  Branch to RHHD.
  Test CCW 3rd byte for zero.

RHHD:
  Read one byte from UCW bump addressed by T.
  Increment the value of the T register and put the result in T.
  Branch to RHJD.
  (UCW 4th byte).

RHJD:
  Disregard information from memory and store information from R in the memory location.
  Branch to RHKD.
  Clear UCW 4th byte.

RHKD:
  Read one byte from main memory addressed by UV.
  Increment the value of the V register by 0010 and put the result in V.
  Branch to RHBF0.
  (CCW 6th byte).

RHBF0:
  Put information from memory into R and regenerate memory.
  Add the R register to zero.
  Branch to RHCF.
  Test CCW 6th byte for zero.

RHCF:
  Read one byte from main memory addressed by UV.
  Decrement the value of the V register and put the result in V.
  Branch to RHDH0 on S6 and Z is 0.
  (CCW 8th byte).

RHDH1:
  Put information from memory into R and regenerate memory.
  Branch to RHEF.

RHEF:
  Read one byte from UCW bump addressed by T.
  Increment the value of the T register and put the result in T.
  Branch to RHFF.
  (UCW 5th byte).

RHFF:
  Disregard information from memory and store information from R in the memory location.
  Branch to RHGF.
  Clear UCW 5th byte.

RHGF:
  Read one byte from main memory addressed by UV.
  Decrement the value of the V register by 0010 and put the result in V.
  Branch to RHHF0 on S6 and 1.

RHHF0:
  Put information from memory into R and regenerate memory.
  Branch to RHJF.

RHJF:
  Read one byte from UCW bump addressed by T.
  AND the T register with the complement of 0000 0111 and place the result in T.
  Branch to RHKF.

RHKF:
  Disregard information from memory and store information from R in the memory location.
  Increment the value of the T register and put the result in T.
  Branch to RHLF.

RHLF:
Read one byte from main memory addressed by UV.
Add the V register to 0000 0100 and place the result in V and the carry out into the carry latch.
Branch to RHFH0 on S6 and 0.

RHFH0:
Put information from memory into R and regenerate memory.
AND the R register with the complement of 0000 0111 and place the result in D.
Branch to RHGH.

RHGH:
Read one byte from UCW bump addressed by T.
OR the low four bits of the G register with the D register and place the result in R.
Branch to RHHH.

RHHH:
Disregard information from memory and store information from R in the memory location.
Increment the value of the T register and put the result in T.
Branch to RHJH0 on S2 and 1.

RHJH0:
AND the T register with the complement of 0000 0111 and place the result in T.
Branch to RHBJ.

RHBJ:
Read one byte from UCW bump addressed by T.
Add zero to 0001 0001 with a forced carry-in and place the result in D and the carry out into the carry latch.
Branch to RHCJ.

RHCJ:
OR the high four bits of the R register with the D register and place the result in R.
Turn off S4 and S5.
Branch to RHDJ.

RHDJ:
Put information from memory into R and regenerate memory.
Set the PA Interface register using the constant 00101.
Turn off S7.
Branch to RHEJ0.

RHEJ0:
Test the PT register using the mask 0001 0000.
Branch to RHFJ0 on 0 and S3.

RHFJ0:
Move the D register to the D register and turn on the carry latch.
Branch to RHEJ0 on 1 and Z is 0.

RHEJ1:
Test the PT register using the mask 0000 0010.
Turn on S6.
Branch to RHHK0 on S6 and 0.

RHHK0:
Set the PA Interface register using the constant 00000.
Branch to RHJK0 on 1 and Z is 0.

RHJK0:
Test the PT register using the mask 0001 0001.
Turn S4 on if high four bits of adder output is all zero.
Turn S4 off otherwise. Turn S5 on if low four bits of adder output is all zero. Turn S5 off otherwise.
Branch to RHKK.

RHKK:
Clear the D register and turn off the carry latch.
Turn on S7.
Branch to RBJE0 on S4 and S5.

RBHE2:
Clear the D register and turn off the carry latch.
Branch to RBJE0 on S4 and S5.
(Same as Multiplex Share Routine from this point).

Microprogram work RBKB1 tested and found the "Count" reduced to zero. This caused a branch to test for CDA, and finding a CDA caused the forty-eight steps just described. These steps replaced *one* step, RBBE2, that would normally be taken in a Multiplex Share routine had the Count been now zero.

*Command chainging*

RFBB:
Clear the D register and turn off the carry latch.
Branch to RFCB0 on S4 and S5.

RFCB2:
AND the T register with the complement of 0000 0111 and place the result in T.
Turn off S4 and S5.
Branch to RFDC0.

RFDC0:
Read one byte from UCW bump addressed by T.
Clear the D register and turn off the carry latch.
Turn S2 off.
Branch to RFEC.

RFEC:
Put information from memory into R and regenerate memory.
AND the R register with the complement of 0000 0011 and place the result in D.
Branch to RFFC.

RFFC:
Read one byte from UCW bump addressed by T.
OR the S register with the D register and place the result in R.
Branch to RFGC.

RFGC:
Disregard information from memory and store information from R in the memory location.
Move the R register to the S register.
Branch to RFGB.

RFGB:
AND the G register with the complement of 0000 0001 and place the result in G.
Turn S2 off.
Branch to RFHB.

RFHB:
Increment the value of the T registery by 0110 and put the result in T.
Branch to RFJB.

RFJB:
Read one byte from UCW bump addressed by T.
Increment the value of the T register and put the result in T.
Branch to RFKB.

RFKB:
Put information from memory into R and regenerate memory.
Move the R register to the V register.
Branch to RFLB.

RFLB:
Read one byte from UCW bump addressed by T.
AND the T register with the complement of 0000 0111 and place the result in T.
Branch to RFKC.

RFKC:
Put information from memory into R and regenerate memory.
Move the R register to the U register.
Branch to QGJD2.

QGJD2:
Test the G register using the mask 1000 0000.
Branch to PFCB.

PFCB:
Move the PI register to the D register.
Branch to PFDB0 on 1 and Z is 0.

PFDB1:
Test the D register using the mask 1001 0000.
Branch to PFEB.

PFEB:
 Test the S register using the mask 1101 0000.
 Branch to PFAF0 on 1 and Z is 0.
PFAF1:
 Test the D register using the mask 0011 0011.
 Branch to PFGE0 on 1 and Z is 0.
PFGE1:
 Test the D register using the mask 0000 0100.
 Branch to PFHC0 on 1 and Z is 0.
PFHC1:
 Test the D register using the mask 0000 1000.
 Branch to PFJA0 on 1 and Z is 0.
PFJA0:
 Test the G register using the mask 0100 0000.
 Branch to PFKA0 on 0 and Z is 0.
PFKA0:
 Test the D register using the mask 0100 0000.
 Branch to PGBA0 on 0 and Z is 0.
PGBA0:
 Set the PB Interface register using the constant 00111.
 Turn off S7.
 Branch to PGAB0 on 0 and Z is 0.
PGAB1:
 Increment the value of the T register by 0010 and put the result in T.
 Branch to PGCB.
PGCB:
 Clear the R register.
 Turn off S6.
 Branch to PGDA0 on 0 and G7.
PGDA0:
 Set the PA Interface register using the constant 00011.
 Turn on S7.
 Branch to PGEA0.
PGEA0:
 Test the PT register using the mask 0000 0001.
 Branch to PGFA0 on AC and 1.
PGFA0:
 Increment the value of the R register and put the result in R.
 Branch to PGEA0 on 1 and Z is 0.
PGEA1:
 Set the PA Interface register using the constant 0001.
 Turn S2 off.
 Branch to PGHA:
PGHA:
 Set the PB Interface register using the constant 00110.
 Branch to QBBB.
QBBB:
 Read one byte from main memory addressed by UV.
 Increment the value of the V register and put the result in V.
 Branch to QBCB.
QBCB:
 Put information from memory into R and regenerate memory.
 Move the R register to the D register.
 Branch to QBDB.
QBDB:
 Read one byte from main memory address by UV.
 Subtract 0000 1111 from the low four bits of the D register with a forced carry-in.
 Branch to QBEB.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A multiplexing system for transferring data between a data processing system and a plurality of addressable peripheral units, including a storage for data and instructions whereby the latter performs operations on said data within said data processing system, each instruction of said instructions including groups of signal bits for addressing a designated peripheral unit for the transfer of data between the designated peripheral unit and the data processing system, comprising
 means responsive to said groups of signal bits for selecting storage address locations identified with said peripheral unit, said storage address locations containing a unit control word and command control words for controlling the activity of a designated peripheral unit, said unit control word including control signal bits, specifying unit activity, derived from a current command control word, and address bits representing the address of a succeeding command control word;
 status testing means for testing said unit control word for status bits indicating whether the designated peripheral unit is available or not available for data transfer, and operable in response to the status bit signifying unit availability to cause transfer of the control signal bits from the current command control word into said unit control word to govern the activities of said peripheral unit during data transfer;
 means responsive to said control signal bits for effecting the specified unit activity;
 and means responsive to the control signal bits in said unit control word upon completion of the activity of the designated peripheral unit as specified by said current command control word, for updating the unit control word with address bits, and control signal bits derived from a command control word succeeding said current control word.

2. The system of claim 1 wherein said unit control word specifies the operation to be performed and the addresses in storage associated with data transfer.

3. The system of claim 2 wherein said unit control word may contain flag bits for chaining of data addresses contained in a series of command control words,
 and means responsive to said flag bits for selecting the succeeding command control word as specified by the updated address contained in said unit control word, upon termination of said peripheral unit activity specified by the current command control word to govern the succeeding activity of said peripheral unit.

4. A system as in claim 3 wherein said command control word includes a skip flag bit,
 and means responsive to said skip flag bit to cause the suspension of data transfer between a designated peripheral unit and said data processing system.

5. The system of claim 2 wherein said unit control word may contain chain flag bits designating the chaining of operations specified in a series of command control words,
 means responsive to said flag bits for selecting and effecting the operations, chained by said chain flag bits, in said series of command control words each specified by each updated address contained in said unit control word, upon termination of each of said operations of said peripheral unit.

6. A system as in claim 2 further including a command control word specifying branch address bits and transfer in channel operation bits,
 and means responsive to said operation bits to cause the selected peripheral unit to effect a branch operation upon data specified by said branch address.

7. A multiplexing system for transferring data between a central processing system and a plurality of peripheral units, each identified by a separate address, comprising
 information transmission lines for transmitting data and address signals, said transmission lines connecting said peripheral units in parallel with said central processing system, control lines for transmitting control signals identifying the data and address signals and connecting said peripheral units in parallel with said central processing system, request and response lines for transmitting peripheral unit request signals and central processing system response signals, a polling circuit extending from and returning to said central processing unit and serially interconnecting said peripheral units to said central processing system, means for transmitting polling pulses from said central processing system to said peripheral units and said polling circuit in response to a peripheral unit requesting service with the central processing system, means for interrupting said polling circuit and disconnecting all other peripheral units when a requesting peripheral unit receives a response signal from said central processing system, and interlock means interlocking the request, response and polling circuit lines so that only one peripheral unit may acquire service to the exclusion of all other peripheral units.

References Cited

UNITED STATES PATENTS

| | | | |
|---|---|---|---|
| 3,099,818 | 7/1963 | Murray | 340—172.5 |
| 3,200,380 | 8/1965 | MacDonald et al. | 340—172.5 |
| 3,221,307 | 11/1965 | Manning | 340—172.5 |

ROBERT C. BAILEY, *Primary Examiner.*

O. E. TODD, *Assistant Examiner.*